US006507874B1

(12) United States Patent
Tuniman et al.

(10) Patent No.: US 6,507,874 B1
(45) Date of Patent: Jan. 14, 2003

(54) SYSTEM FOR EFFICIENT ROUTING AND TRANSLATION OF DATA

(75) Inventors: David Tuniman, Redmond; Dave Wecker, Bothell; Vinay Deo, Bellevue; Don Kadyk, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,899

(22) Filed: Jun. 30, 1998

Related U.S. Application Data

(60) Provisional application No. 60/070,720, filed on Jan. 7, 1998, and provisional application No. 60/075,123, filed on Feb. 13, 1998.

(51) Int. Cl.[7] .............................................. G06F 15/16
(52) U.S. Cl. ........................ 709/247; 709/238; 380/262
(58) Field of Search ................................ 709/238, 246, 709/247; 380/259, 262, 28, 29

(56) References Cited

U.S. PATENT DOCUMENTS

| 4,593,155 A | 6/1986 | Hawkins ..................... 455/411 |
| 4,916,637 A | 4/1990 | Allen et al. .................... 706/11 |
| 5,014,345 A | 5/1991 | Comroe et al. ............. 455/519 |
| 5,043,721 A | 8/1991 | May .......................... 340/7.54 |

(List continued on next page.)

FOREIGN PATENT DOCUMENTS

| EP | 0 434 231 A2 | 6/1991 |
| EP | 0 653 736 A1 | 5/1995 |
| EP | 0 704 827 A1 | 4/1996 |
| EP | 0 803 825 A2 | 10/1997 |
| WO | WO 90/13213 | 11/1990 |
| WO | WO 97/17682 | 5/1997 |
| WO | WO 97/35402 | 9/1997 |

OTHER PUBLICATIONS

Y. Rekhter et al., RFC 2105: Cisco Systems' Tag Switching Architecture Overview, Network Working group, 10 pages, Feb. 1997.*
Xipeng Xiao et al., A Comprehensive Comparison of IP Switching and Tag Switching, Proc of 1997 Intl Conf on Parallel and Distributed Systems, 7 pages, Dec. 1997.*
Paul F. Syverson et al., Anonymous Connections and Onion Routing, 1997 IEEE Symposium on Security and Privacy, 11 pages, May 1997.*
Castedo Ellerman, "Channel Definition Format (CDF)," Channel Definition Format Submission 970309, 11 pages, (Mar. 1997).
Fabio Vitali et al., "Extending HTML in a Principled Way With *Displets*," Computer Networks and ISDN Systems, vol. 29, pp. 1115–1128 (1997).
Downloaded from http://www.techweb.com/se/directlink.cgi/IWK19970609S004, 5 pages (Jun. 1997). Information Week "Push Your Web Pages –Netscape's Netcaster and Microsoft's CDF make it easier than ever to join the push revolution", Issue 634.
Michail Salampasis et al., "HyperTree: A Structural Approach to Web Authoring," Software –Practice And Experience, Col. 27 (12), pp. 1411–1426 (Dec. 1997).
U.S. patent application Ser. No. 09/107,941, Wecker et al., filed Jun. 30, 1998.

*Primary Examiner*—Patrice Winder
(74) *Attorney, Agent, or Firm*—Theodore M. Magee; Westman, Champlin & Kelly, P.A.

(57) ABSTRACT

A recovery system is capable of recovering a core set of data from an input set of data. The input set of data is accompanied by a translator identifier and both items are received by a receiver in the recovery system. The receiver passes the input set of data to a message router that is capable of accessing a tag list based on the translator identifier before the recovery system has translated the input set of data. The message router is also capable of routing data based on the accessed tag list.

30 Claims, 19 Drawing Sheets

U.S. PATENT DOCUMENTS

| | | |
|---|---|---|
| 5,367,667 A | 11/1994 | Wahlquist et al. ............. 714/32 |
| 5,400,331 A | 3/1995 | Lucak et al. ................. 370/401 |
| 5,559,800 A | 9/1996 | Mousseau et al. ........... 370/401 |
| 5,603,025 A | 2/1997 | Tabb et al. ...................... 707/2 |
| 5,619,615 A | 4/1997 | Pitchaikani et al. ........... 706/10 |
| 5,619,694 A | 4/1997 | Shimazu .................. 707/104.1 |
| 5,623,656 A | 4/1997 | Lyons ........................... 707/10 |
| 5,640,590 A | 6/1997 | Luther ..................... 707/500.1 |
| 5,675,780 A | 10/1997 | Plant-Mason et al. .......... 707/6 |
| 5,675,831 A | 10/1997 | Caputo ......................... 710/10 |
| 5,680,585 A | 10/1997 | Bruell ........................... 703/26 |
| 5,701,451 A | 12/1997 | Rogers et al. ................... 707/1 |
| 5,705,995 A | 1/1998 | Laflin et al. ................ 340/7.48 |
| 5,740,549 A | 4/1998 | Reilly et al. ................... 705/14 |
| 5,754,242 A | 5/1998 | Ohkami ....................... 348/441 |
| 5,796,952 A | 8/1998 | Davis et al. ................. 709/224 |
| 5,799,151 A | 8/1998 | Hoffer ........................ 709/204 |
| 5,809,247 A | 9/1998 | Richardson et al. ......... 709/218 |
| 5,861,883 A | 1/1999 | Cuomo et al. ............... 345/733 |
| 5,875,306 A | 2/1999 | Bereiter ....................... 709/220 |
| 5,884,097 A | 3/1999 | Li et al. ......................... 710/43 |
| 5,903,262 A | 5/1999 | Ichihashi et al. ............ 725/136 |
| 5,905,856 A | 5/1999 | Ottensooser ................. 714/38 |
| 5,920,696 A | 7/1999 | Brandt et al. ................ 709/218 |
| 5,923,738 A | 7/1999 | Cardillo, IV et al. ..... 379/93.25 |
| 5,933,501 A * | 8/1999 | Leppek ........................ 380/259 |
| 5,933,826 A | 8/1999 | Ferguson ........................ 707/9 |
| 5,935,060 A | 8/1999 | Iliff ............................. 600/300 |
| 5,937,041 A | 8/1999 | Cardillo, IV et al. ..... 379/93.25 |
| 5,943,496 A | 8/1999 | Li et al. ...................... 709/328 |
| 5,946,326 A | 8/1999 | Rinne ........................... 725/54 |
| 5,953,423 A | 9/1999 | Martinez et al. ............... 705/65 |
| 5,953,524 A | 9/1999 | Meng et al. ................. 717/188 |
| 5,963,944 A | 10/1999 | Adams ......................... 707/10 |
| 5,974,085 A | 10/1999 | Smith ......................... 375/222 |
| 5,974,238 A | 10/1999 | Chase, Jr. .................... 709/248 |
| 5,999,941 A | 12/1999 | Anderson ............... 707/103 R |
| 6,005,490 A | 12/1999 | Higashihara ........... 340/825.72 |
| 6,009,456 A * | 12/1999 | Frew et al. .................. 709/202 |
| 6,041,183 A | 3/2000 | Hayafune et al. ............ 717/173 |
| 6,061,698 A | 5/2000 | Chadha et al. .............. 707/513 |
| 6,067,574 A * | 5/2000 | Tzeng ......................... 709/247 |
| 6,078,743 A | 6/2000 | Apte et al. ................... 717/100 |
| 6,085,224 A | 7/2000 | Wagner ....................... 709/203 |
| 6,112,242 A | 8/2000 | Jois et al. .................... 709/225 |
| 6,151,610 A | 11/2000 | Senn et al. .................. 707/516 |
| 6,233,338 B1 * | 5/2001 | Leppek .......................... 380/28 |
| 6,311,058 B1 | 10/2001 | Wecker et al. .............. 455/418 |

* cited by examiner

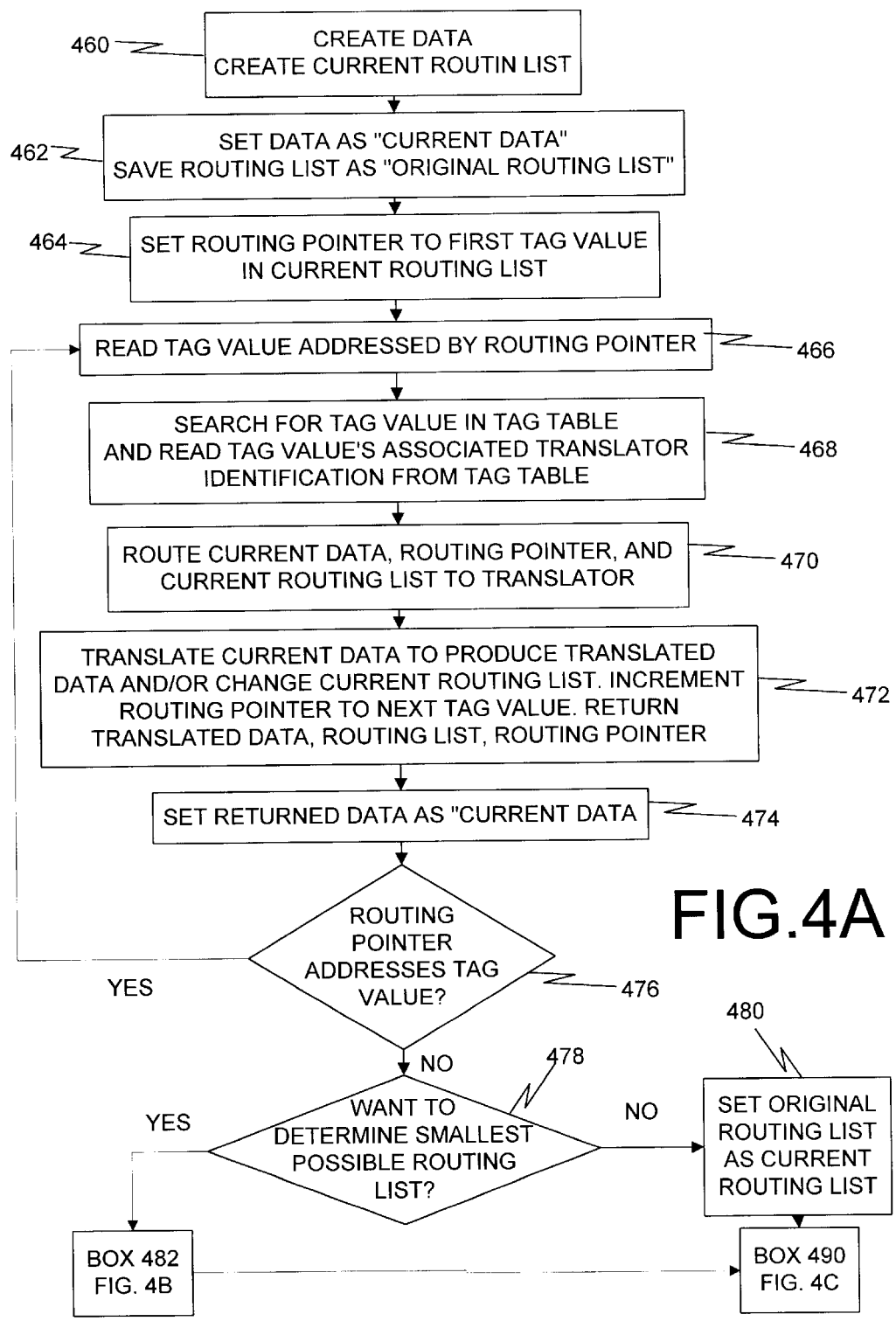

| TAG VALUE | TRANSLATOR ID | TRANSLATOR NAME |
|---|---|---|
| 20 | COMPI.DLL | COMP-I |
| 21 | COMPII.DLL | COMP-II |
| 22 | ENCRYPTI.DLL | ENCRYPT-I |
| ⋮ | ⋮ | ⋮ |
| 3E | LZ77.DLL | LZ77 |
| 3F | FLEXENCODE.DLL | FLEX |
| 40 20 | 12/16LLCODEI.DLL | 12/16RUN-LENGTH |
| 40 21 | FIRECODEI.DLL | FIRECODE-I |
| 40 22 | FIRECODEII.DLL | FIRECODEII |
| ⋮ | ⋮ | ⋮ |
| 4F 7E | ECC1.DLL | ECC-1 |
| 4F 7C | ECC2.DLL | ECC-2 |
| 50 20 20 | 16/17TRELLIS.DLL | 16/17TRELLIS |
| 50 20 21 | QQQW.DL | QQQW |
| 50 20 22 | AWAAA.DLL | ANDERSON |
| ⋮ | ⋮ | ⋮ |
| 50 7C 7C | R4ETE.DLL | SUPERCOMPRESS |
| ⋮ | ⋮ | ⋮ |
| 5F 7C 7C | YOYO23.DLL | LOCK OUT |
| 60 23 21 3F 5A 62 | JOE'SSITE.DLL | JOES ENCRYPT |
| 70 | EECMACRO.DLL | ENCODE/ENCRYPT/ COMPRESS |

FIG. 7

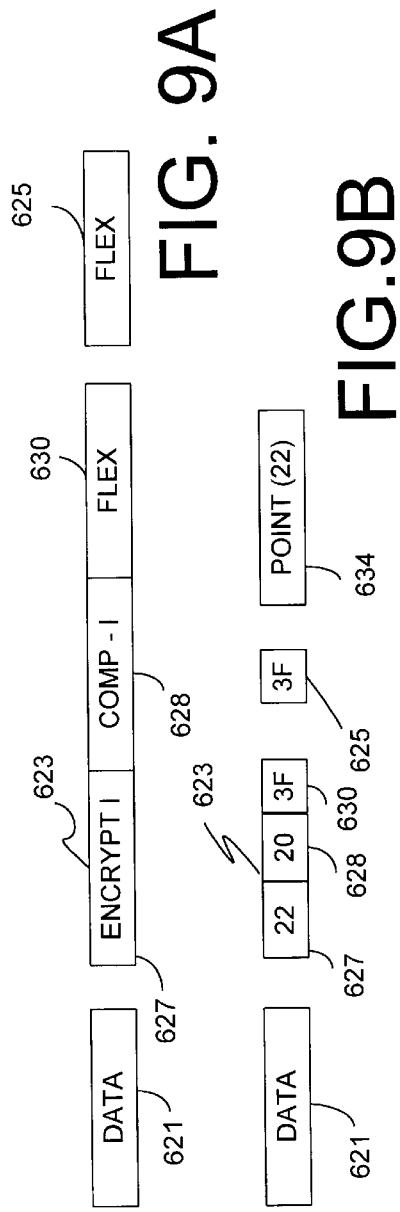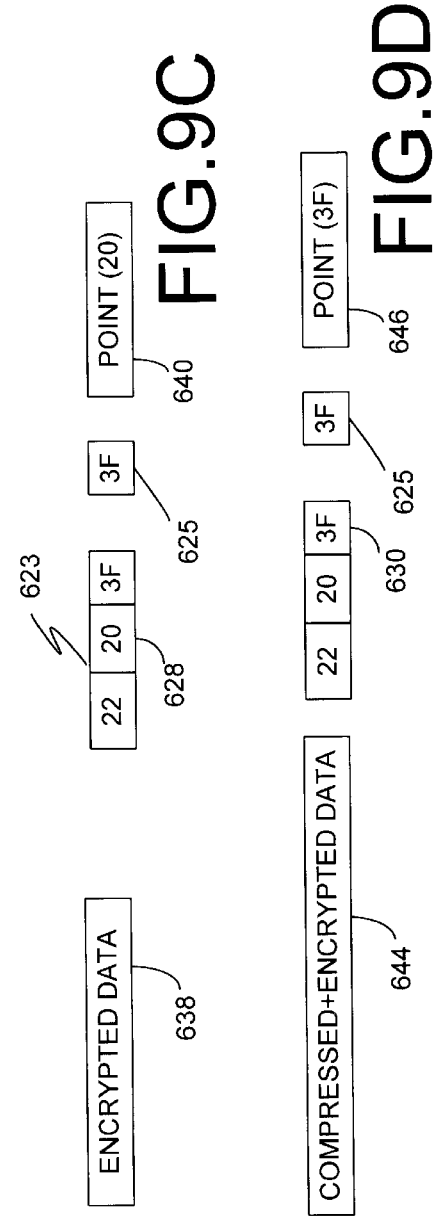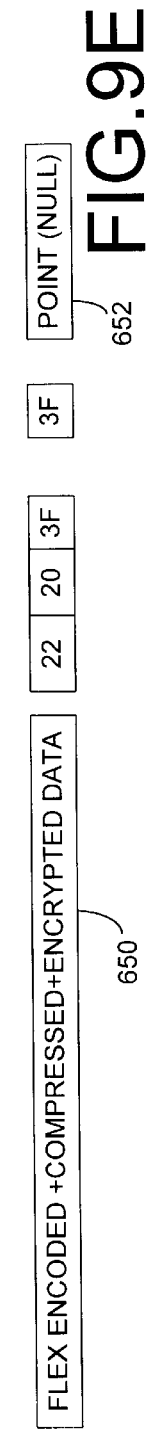

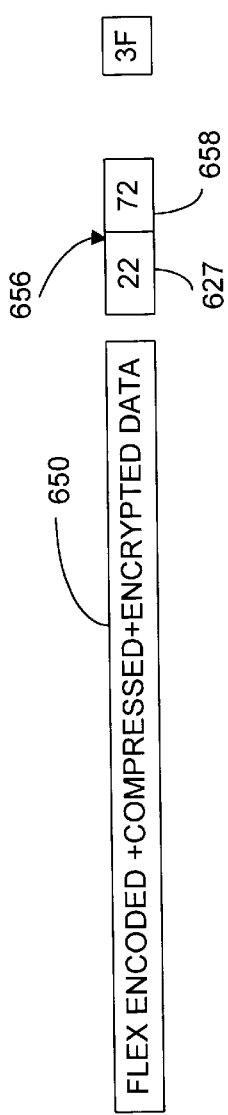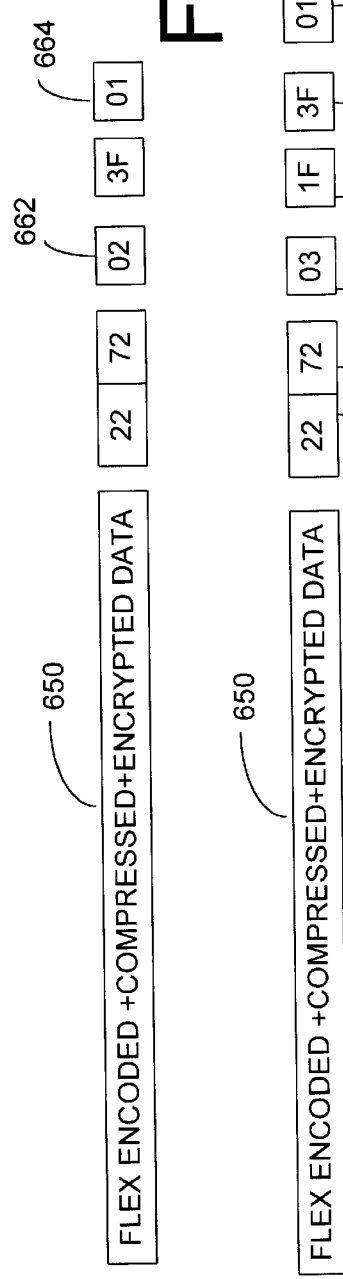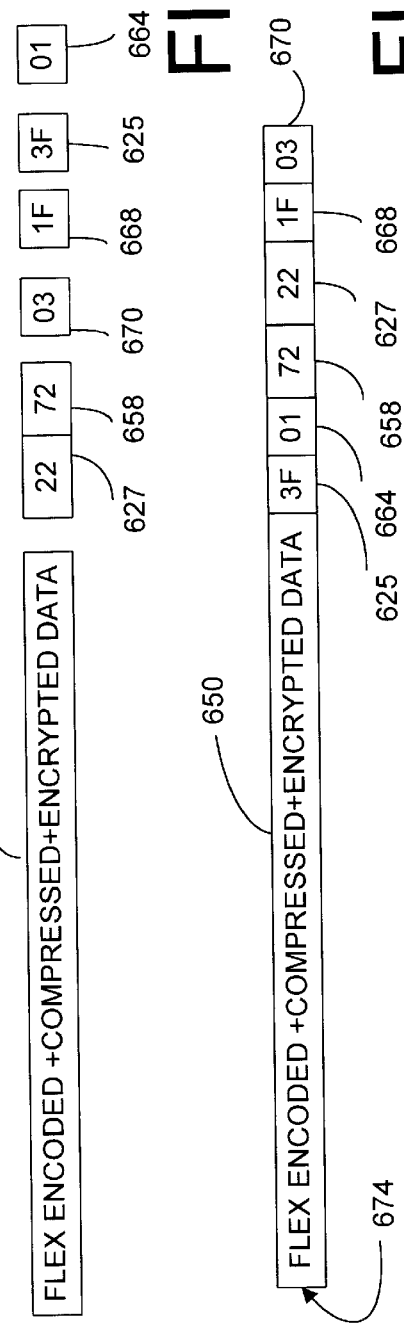

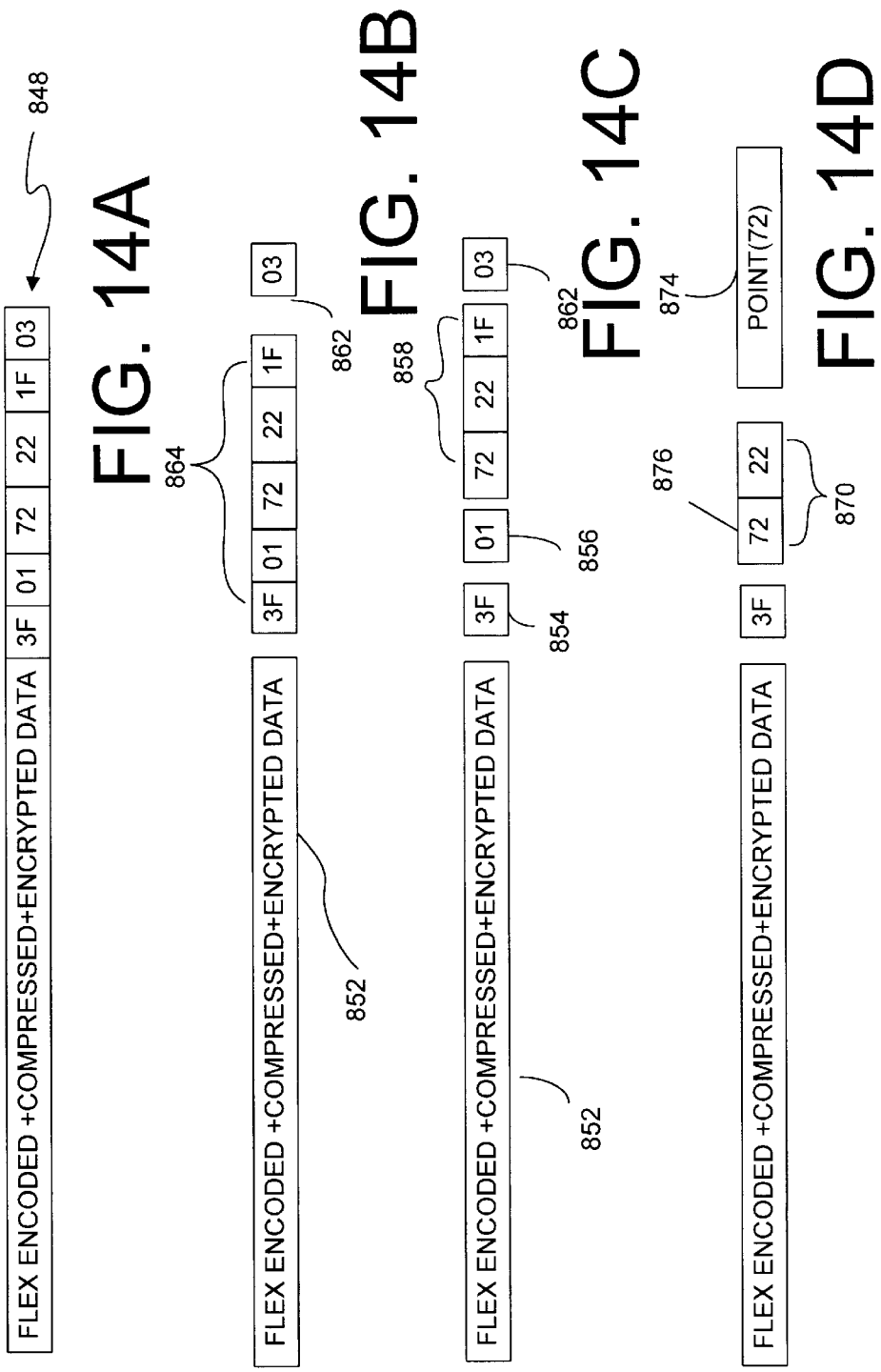

SYSTEM FOR EFFICIENT ROUTING AND TRANSLATION OF DATA

CROSS-REFERENCE TO RELATED APPLICATION

The present application is based on provisional application serial No. 60/070,720 filed on Jan. 7, 1998 and provisional application serial No. 60/075,123 filed on Feb. 13, 1998.

BACKGROUND OF THE INVENTION

The present invention relates to the translation of data from one format to another. In particular, the present invention relates to the efficient routing of data for translation.

Data translation is a common technique for converting data from one format to another so that it is better suited for a particular use. Examples of translations include encryption, compression and encoding. Encryption is typically used to secure data so that unauthorized users cannot access the data. Compression is used to reduce the number of bytes in the data by, for example, removing redundant bytes. Encoding is used to convert data from one set of representations to another set to overcome restrictions placed on the character set by a transmission channel. For example, encoding is used to convert 8-bit binary values into 7-bit ASCII values for transmission over channels that cannot handle 8-bit data.

In many applications, it is desirable to perform multiple translations on a single piece of data. Thus, data may be encrypted, encoded, and then compressed before being sent across a channel extending between two locations. With multiple translations, the system attempting to recover the data from the channel must be able to determine the types of translations that were performed on the data, and the order in which the translations were performed. Once the recovery system has this information, it can reverse the translations to recover the original data.

The simplest method for providing translation information to a recovery system is to use a fixed set of translations that are programmed into the recovery system. In this type of system, every piece of data is translated using the same set of translations in the same order. This method minimizes the amount of translation information that must be passed across the channel but lacks the flexibility that would allow translations to be selected dynamically as data or applications require.

In an alternative method, each translator on the production side creates a translation header that is attached to the translated data produced by the translator. Thus, an encryption translator attaches an encryption header to the encrypted data it produces, and a compression translator attaches a compression header to the compressed data it produces.

In this alternative method, each translator creates its header without reference to earlier translations. In fact, each translator treats existing headers that accompany the data as a portion of the data. Thus, if a piece of data is encrypted and then compressed, the compression translator will compress the encryption header in the same manner that it compresses the encrypted data. This obscures the encryption header in the compressed data so that it is not apparent to the recovery system that the data has been encrypted simply by looking at the compressed data or the compression header.

Since earlier headers are obscured by later translations, the recovery system is only able to identify the last translation performed on a piece of data it receives from the channel. Thus, the recovery system cannot determine from the channel data if it has all of the translation tools necessary to recover the original message. As such, it must begin to translate the data with the hope that it will have all of the necessary tools. If after performing a number of translations on the data, the recovery system encounters a translation it cannot handle, the recovery system must reject the data. If this occurs, any earlier translations performed by the recovery system needlessly wasted computer resources. For wireless devices, such as handheld computers, the wasting of computer resources reduces the performance of the device by drawing power and computing time away from other processes.

SUMMARY OF THE INVENTION

A recovery system is capable of recovering a core set of data from an input set of data. The input set of data is accompanied by a translator identifier and both items are received by a receiver in the recovery system. The receiver passes the data to a message router that is capable of accessing a tag list based on the translator identifier before the recovery system has translated the input set of data. The message router is also capable of routing data based on the accessed tag list.

In some embodiments of the present invention, the receiver is a driver, which is part of a wireless system. The driver is able to reject the input set of data if the recovery system does not include a translator required to recover the core set of data. In further embodiments, the driver is capable of rejecting the input set of data before the message router has accessed the tag list. Thus, in wireless devices, these embodiments of the invention do not "wake-up" the device unless the device has all of the needed translators.

One embodiment of the invention uses macro-tags, which represent multiple translations. Based upon applications on the recovery system, translators available on the recovery system, or a macro-tag table, at least one translator on the recovery system is able to expand a macro-tag into a series of tag values.

In one embodiment of the invention, the tag list is simply assigned by the receiver based on the address on which the message was received. In such embodiments, tags do not need to be sent with the data, reducing the overhead associated with the transmission.

BRIEF DESCRIPTION OF THE DRAWINGS

FIGS. 4A, 4B, and 4C are flow diagrams for a process of producing translated data using the production system of FIG. 3.

FIG. 7 is an example of a tag table.

FIGS. 9A–9I show the formation of a complete data packet from a core set of data using the process of FIGS. 4A, 4B, and 4C.

FIGS. 14A–14H show the formation of a core set of data from a channel packet using the process of FIGS. 13A, 13B, and 13C.

DETAILED DESCRIPTION OF THE PREFERRED EMBODIMENTS

Figure 1:
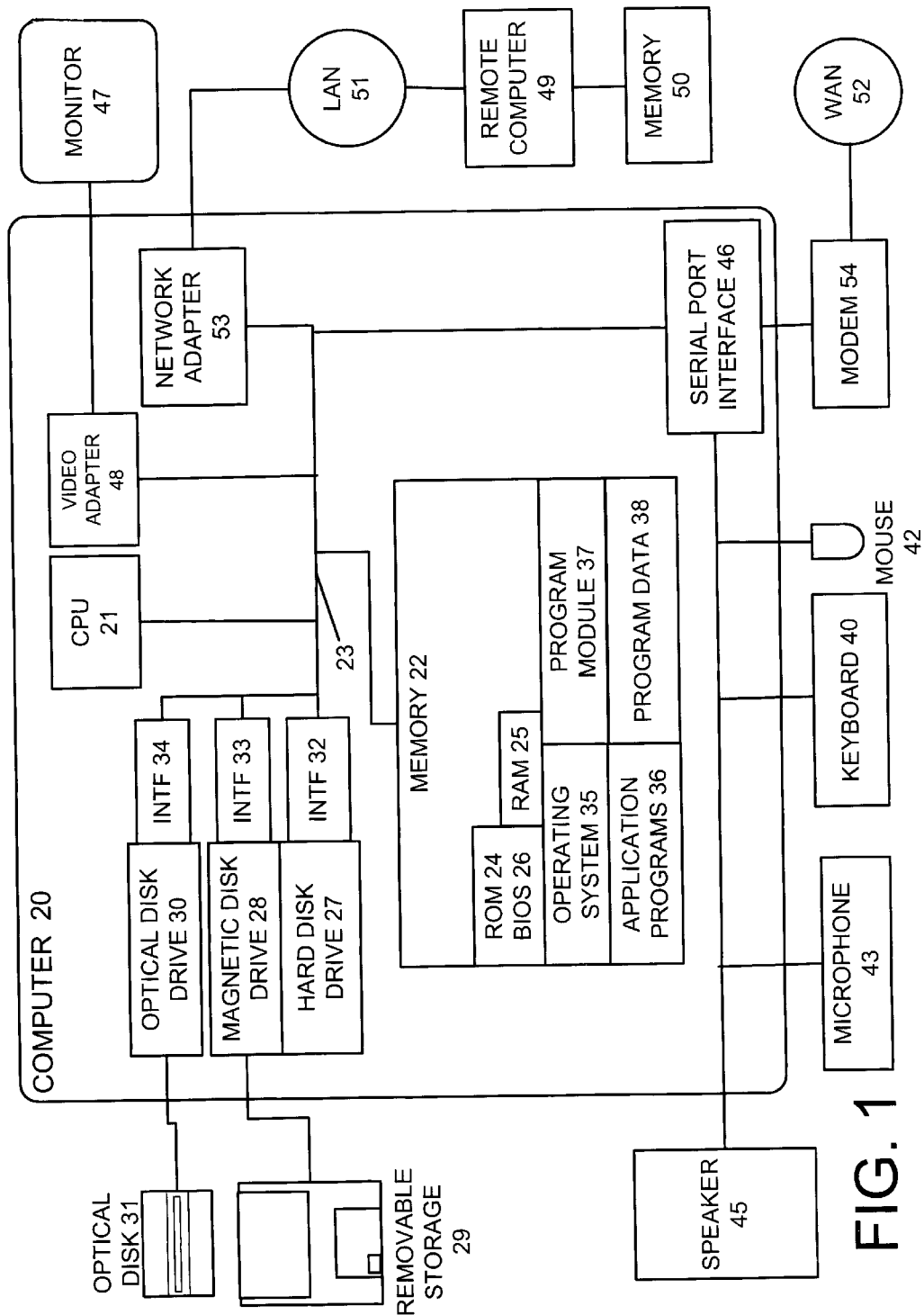
FIG. 1 is a plan view of a portion of an operating system for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
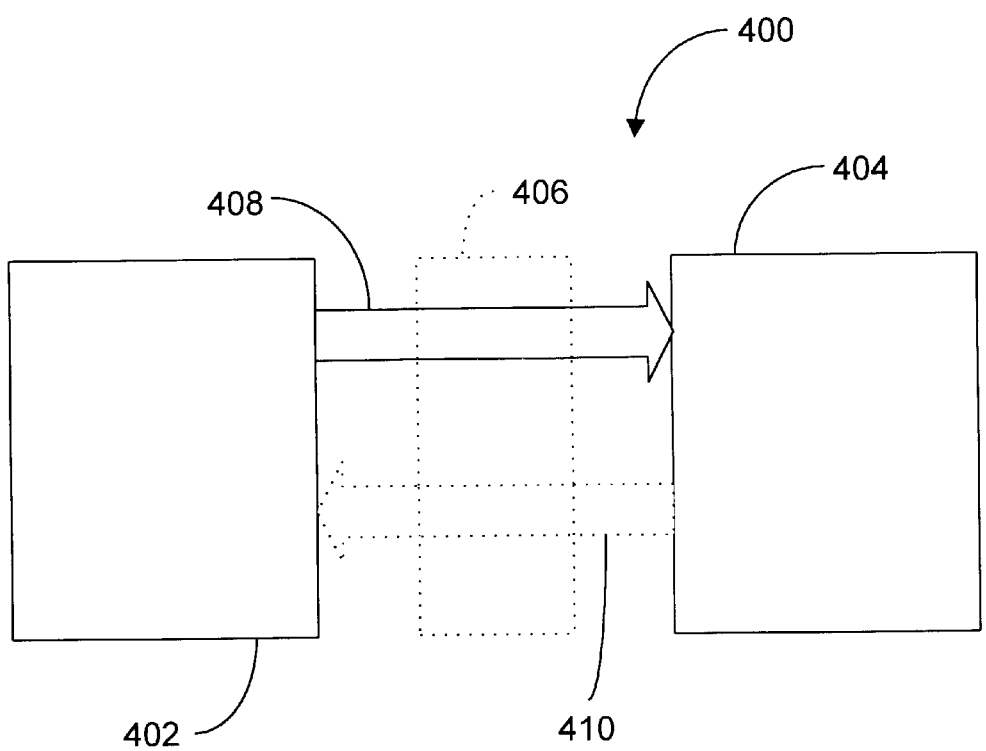
FIG. 2 is a block diagram of a production-recovery system of the present invention.

FIG. 2 is a block diagram of a production-recovery system 400, which includes a production system 402, a recovery system 404 and a channel 406. Production system 402 produces a channel packet 408, which is transmitted through channel 406 to recovery system 404. Channel packet 408 has at least two parts. The first part is a core set of data that has been translated multiple times. The second part, which is concatenated to the translated data, is a header that includes a destination address for the translated data. The header may also include a tag list that indicates all of the translations that were preformed to produce the translated data.

Channel 406 of FIG. 2 can take many forms. In wireless applications, channel 406 represents the space between production system 402 and recovery system 404. Within a single device, channel 406 can include a memory, such as a disk drive, where channel packet 408 is stored for a period of time.

Recovery system 404 recovers channel packet 408 from channel 406 and translates channel packet 408 to recover the core set of data. In some embodiments, recovery system 404 is able to provide a response message 410 to production system 402 to indicate the success or failure of the recovery. Although response message 410 is shown passing through channel 406, those skilled in the art will recognize that response message 410 may pass through a different channel to production system 402.

Figure 3:
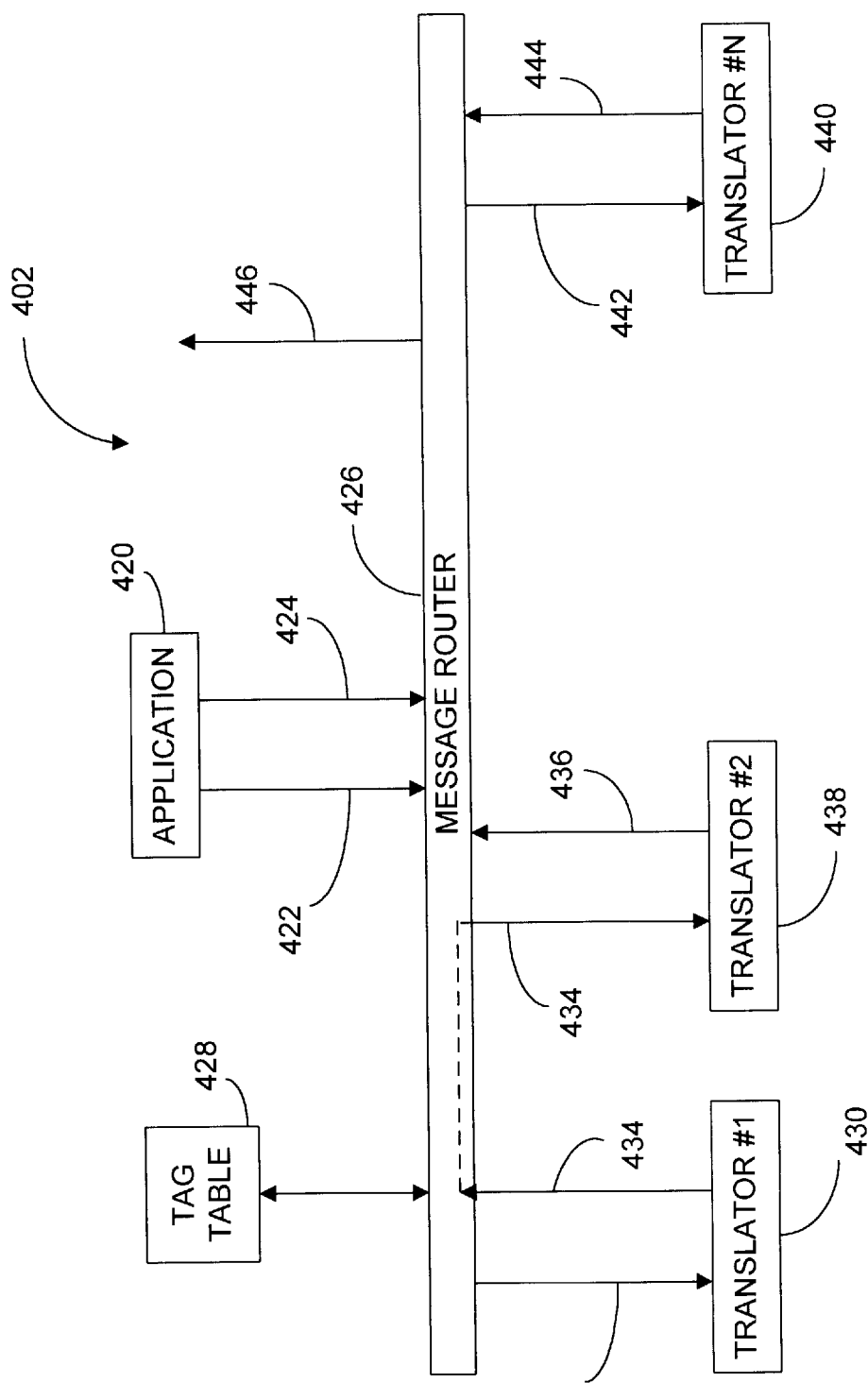
FIG. 3 is a block diagram of the production system of FIG. 2.

FIG. 3 is a block diagram of an embodiment of production system 402 of FIG. 2. In production system 402, an application 420 produces a routing list 422 and a core set of data 424 that are passed to a message router 426. Message router 426 uses routing list 422 and a tag table 428 to select a plurality of translators. Message router 426 then passes routing list 422, core set of data 424, and a routing list pointer to each of the translators.

For example, in FIG. 3, message router 426 first selects and invokes translator 430, which receives routing list 422, a routing list pointer, and core set of data 424 in an input package 432. Translator 430 translates the data and/or modifies the routing list as discussed further below. Translator 430 also increments the routing list pointer so that it points at the next tag value in the routing list. The translated data, routing list and routing list pointer are then returned to message router 426 in a packet 434.

Message router 426 then routes packet 434 from translator 430 to the next translator in the routing list, translator 438. Translator 438 further translates the data it receives and/or modifies the routing list. Translator 438 also increments the routing list pointer to point at the next tag value in the routing list and returns the translated data, the routing list and the routing list pointer in a data packet 436.

This process continues for each translator found in the routing list until a last translator 440 performs its translator functions on a data packet 442 to produce a data packet 444. Message router 426 then compares the application's routing list to a destination-based routing list. The destination-based routing list is retrieved from an address-tag table 429, which associates destination addresses with routing lists. The configuration of the table is discussed further below. If the application's routing list, which was used to form data packet 444, matches the destination-based routing list, the application's routing list is not concatenated to data packet 444. However, if the application's routing list is different than the destination-based routing list, the application's routing list is concatenated to data packet 444 to form channel packet 446. The concatenated routing list includes tag values that identify the order of translations the recovery system should use to recover the core set of data. Message router 426 may also concatenate a return routing list to the data to indicate what translators the recovery system should use in preparing return messages.

Figure 4B:
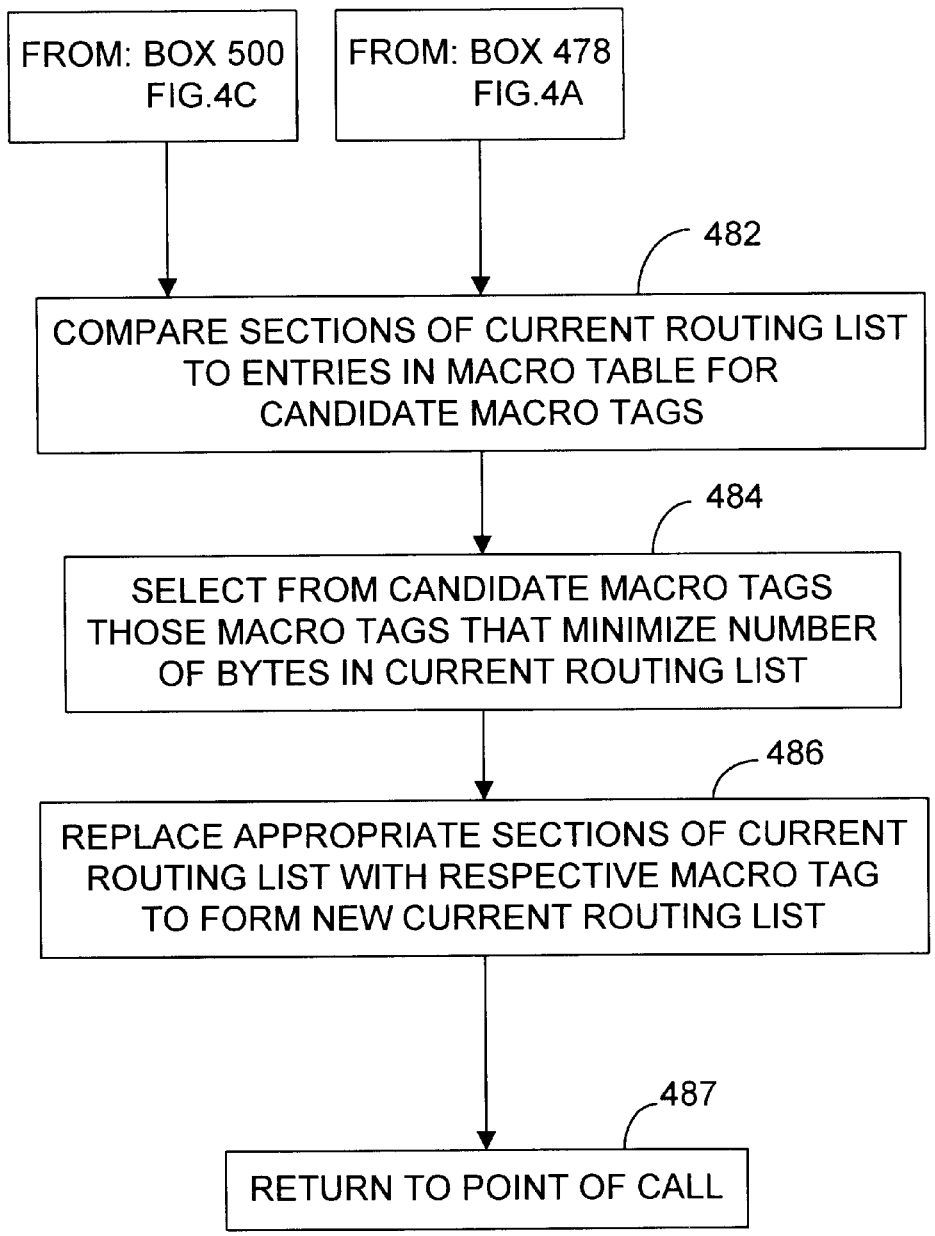
Figure 4C:
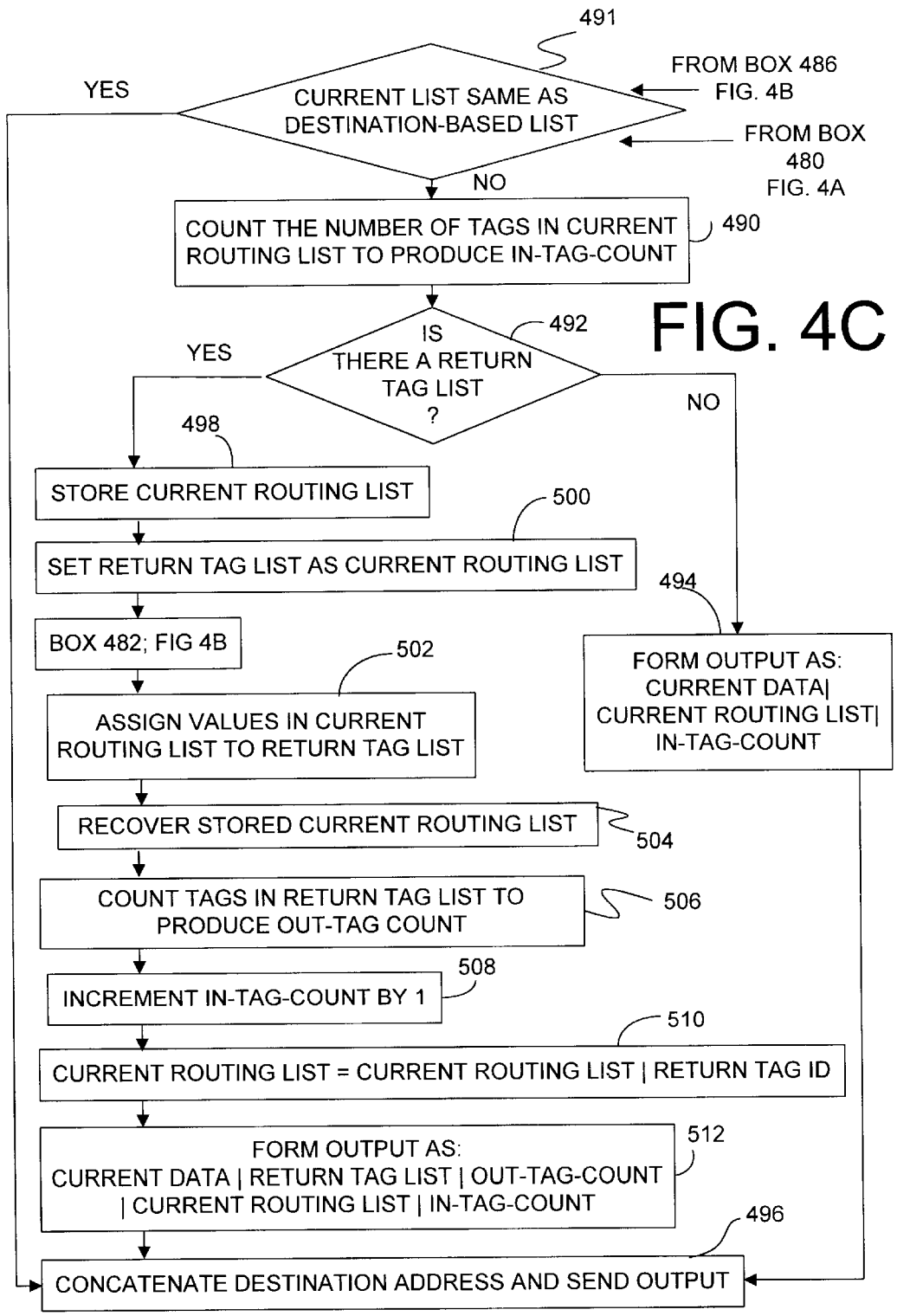

FIGS. 4A, 4B and 4C provide a more detailed flow diagram of the method implemented by production system 402 of FIG. 3. In box 460 of FIG. 4A, the original set of data and the routing list are created by application 420 of FIG. 3. In box 462, the data is set as the "current data" and the routing list is saved as the "original routing list". The "current data" will always contain the current state of the data as it passes through a sequence of translators discussed below. The "original routing list" is saved to provide a record of how the routing list appeared when it was produced by the application. This is necessary since the routing list may be modified as it passes through the translators.

Figure 5:
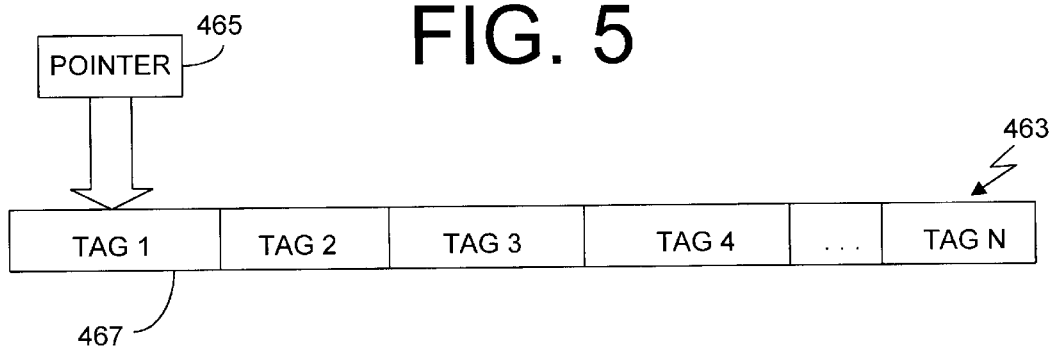
FIG. 5 is a structural diagram of the structure of a routing list.

In box 464, a routing pointer is set to point at the first tag value in the current routing list. An example of a routing list and a routing pointer are shown in FIG. 5 as routing list 467 and routing pointer 465, respectively. Routing pointer 465 contains the address of a first tag 467 in routing list 463. Those skilled in the art will recognize that routing pointer 465 can provide relative or absolute addressing to the location of tag 467 in memory.

Figure 6A:
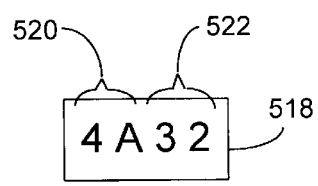
FIG. 6A shows the structure of a two-byte tag.

The tag values in routing list 463 can have different lengths. In preferred embodiments, tag values can have lengths of one byte, two bytes, three bytes, or a variable number of bytes. One byte tags have values of 20–3F hexadecimal or 70–7C hexadecimal. Two byte tags begin with a byte having a hexadecimal value between 40 and 4F hexadecimal and end with a byte having a hexadecimal value between 20 and 7C. Tag 518 shown in FIG. 6A is an example of a two-byte tag having a first byte 520 and a second byte 522. First byte 520 has a value of "4A", which identifies byte 520 as being part of a two-byte tag. Second byte 522 has a value of "32" and together with first byte 520 represents the complete tag value of "4A32". Since both bytes of a two-byte tag form the value of the tag, there are over 1,488 possible two-byte tag values (16*93) in preferred embodiments of the present invention.

Three-byte tags include a first byte with a hexadecimal value between 50 and 5F, a second byte with a hexadecimal value between 20 and 7C and a third byte with a hexadecimal value between 20 and 7C. The first byte indicates that the tag value is a three-byte tag value and all three bytes together form the three-byte tag's value. An example of a three-byte tag is shown in FIG. GB where tag 524 is constructed from first byte 526, second byte 528, and third byte 530. Bytes 526, 528, and 530 have respective values of "54", "21", and "6E" to form the full three-byte value of "54216E".

The present invention also supports variable length tag values. In one embodiment of the invention, variable length tag values are identified by their first byte, which has a value between 60 and 6F hexadecimal. The second byte represents the length of the tag value and has a value between 24 and 2F hexadecimal. This value is converted into the number of bytes in the tag by subtracting 20 hexadecimal from the value. The remaining bytes of the tag can have values between 20 and 7C. An example of a variable length tag is shown in FIG. 6C, where tag 532 is constructed from bytes 534, 536, 538, 540, 542, and 544. Byte 534 is the first byte in the tag and has a value of "62" indicating that it is part of a variable length tag. Byte 536 is the second byte and has a value of "26", which indicates that there are a total of six bytes in the tag. Bytes 538, 540, 542, and 544 have respective values of "5F", "39", "62", and "2A" to form the complete value of "62265F39622A" for tag 532.

Returning to FIG. 4A, once the message router has set the routing pointer to point at the first tag value in the routing list, it advances to box 466 where it reads the tag value addressed by the routing pointer. In box 468, message router 426 uses this tag value to search tag table 428 of FIG. 3.

An example layout of tag table 428 is shown in FIG. 7 as tag table 600, which is one example of a tag table 428. Tag table 600 includes three columns: tag value column 602, translator ID column 604 and translator name column 606. Tag value column 602 contains the hexadecimal tag values found in the routing list. Translator ID column 604 identifies the location of the translator. In preferred embodiments, the translators are Component Object Models (COMs), which are computing constructs from Microsoft Corporation. These COMs are located by their Global Unique Identification (GUID). In such embodiments, the GUID is stored in translator ID column 604. Translator name column 606 includes names by which the translators are commonly known.

For example, entry 608 of the table has a tag value of "3E", representing a translator identification of "LZ77.DLL", which is commonly known as "LZ77". In another example, entry 610 includes a variable length tag of "60 23 21 3F 5A 62" for the translator identification "JOE'SSITE.DLL", which is also known as "Joe's Encrypt". Entry 612 is an example of a macro-tag entry in which the macro-tag has a tag value of "70", a translator identification of "ECCMACRO.DLL", and a translator name of "ENCODE/ENCRYPT/COMPRESS". The macro-tag associated with entry 612 can be expanded into a sequence of tags as is explained further below.

Returning to box 468 of FIG. 4A, upon finding the tag value in the tag table, message router 426 retrieves the tag value's associated translator identification from the table. The production process then continues at box 470.

In box 470, message router 426 routes the current data, the routing pointer and the current routing list to the retrieved translator. In box 472, the translator translates the current data to produce translated data and/or changes the current routing list. Changes to the current routing list are usually performed by macro-tag translators, which are discussed further below in connection with FIG. 8. The translator also increments the routing pointer so that it points at the next tag value in the routing list. The translator then returns the translated data, the routing list and the routing pointer to message router 426.

In box 474, the message router sets the data returned by the translator as the current data. In decision box 476, the routing pointer is checked to see if it is pointing at a tag value. If the last translator incremented the routing pointer outside of the routing list, the routing pointer will be pointing at a "null" value. If the routing pointer is pointing at a tag value in decision box 476, control is returned to box 466 where the tag value is read by the message router. Boxes 468, 470, 472, 474 and 476 will then be repeated using data that has already been translated by the first translator. This loop will continue until the routing pointer reaches the end of the routing list.

When the routing pointer reaches the end of the routing list, the process will continue at decision box 478. Decision box 478 determines whether the smallest possible routing list should be determined for this set of data. If the smallest possible routing list is not desired, the original routing list is set as the current routing list in box 480. Control then passes to box 490 of FIG. 4C. If the smallest possible routing list should be determined, control passes to box 482 of FIG. 4B.

Figure 8:
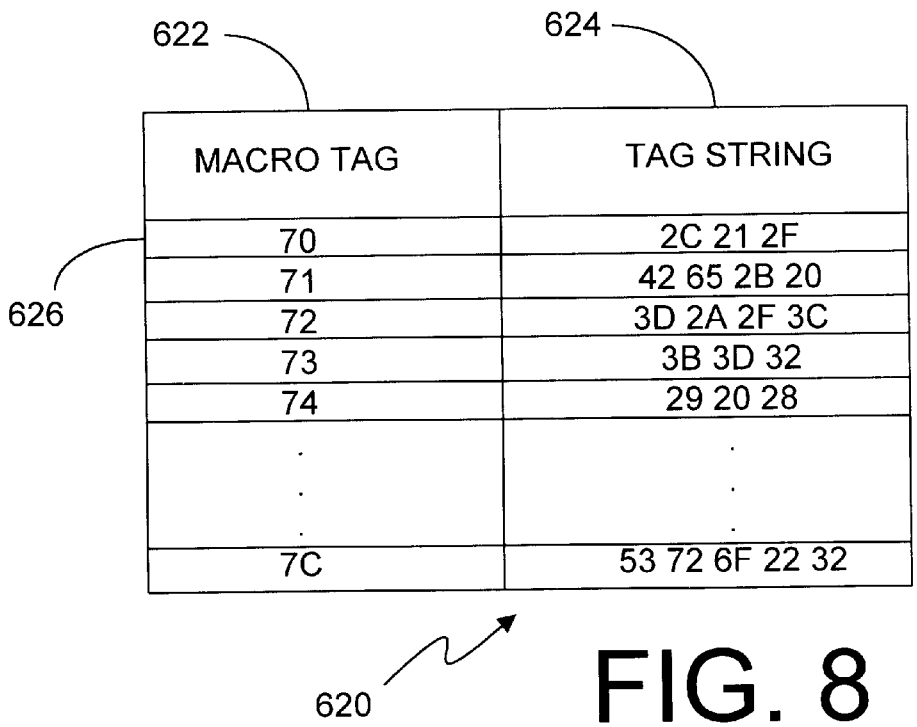
FIG. 8 is an example of a macro-tag table.

FIG. 4B depicts a flow diagram for determining the smallest possible routing list. In box 482, sections of the current routing list are compared against entries in a macro table for candidate macro-tags. An example of such a macro table is shown in FIG. 8 as macro-tag table 620. Macro-tag table 620 includes a macro-tag column 622 and a tag string column 624. Reading from left to right, the tag string identifies a series of tag values that may be replaced by the macro-tag found in the same row as the tag string. Thus, in entry 626, the tag string "2C 21 2F" may be replaced by the macro-tag 70.

Returning to FIG. 4B, after candidate macro-tags have been identified in box 482, those macro-tags that minimize the number of bytes in the current routing list are selected in box 484. In box 486, the appropriate sections of the current routing list are replaced with their respective macro-tags to form a new current routing list. The production process then continues from the point that called box 482.

FIG. 4C is a flow diagram that completes the production process started in FIG. 4A. The first box of FIG. 4C is box 491, which compares the current routing list to a destination-based routing or tag list. Destination-based routing lists are maintained in a hierarchical manner in address-tag table 429 of FIG. 3 as shown below:

| | | |
|---|---|---|
| Global | DefaultRoutingList | |
| | Address1 | RoutingList1 |
| | SubAddressA | RoutingList1A |
| | SubAddressB | <none> |
| | Address2 | RoutingList2 |
| | SubAddressA | RoutingList2A |
| | SubAddressB | RoutingList2B |

In the above table, RoutingList1 and RoutingList2 are the routing lists for primary address Address1 and Address2, respectively. SubAddressA is a sub-address under primary address Address1 and has its own routing list RoutingList1A.

The address-tag table is hierarchical because if a sub-address does not have a routing list, the routing list for it respective primary address is used and if a primary address does not have a routing list, a default routing list is used. For example, if a message was destined for SubAddressB of primary address Address2, in the example above, then its routing list is compared with RoutingList2B. However, if a message was destined for sub-addressB of primary address Address1, the system retrieves routing list RoutingList1, which is designated for primary address Address1, because sub-addressB of primary address address1 does not have an associated routing list. If a sub-address and its respective primary address are not associated with a routing list, the DefaultRoutingList is returned. In preferred embodiments, DefaultRoutingList is never null.

If the entire routing list for the message matches with the destination-based routing list derived above, the process continues at step 496 where the message is transmitted without routing list information. The recipient device has the same hierarchical table and therefore can automatically assign the same routing list to the message based on the address/sub-address of the message.

Although the comparison between the current routing list and a destination-based routing list is shown as occurring after the current routing list has been minimized, those skilled in the art will recognize that the comparison could be performed before the minimization steps.

If the current routing list is different than the destination-based routing list at step 491, the process continues at step 490, which counts the number of tags in the current routing list to produce an in-tag count. Later in the process, the in-tag count will be concatenated to the current routing list so that the recovery system will know how many tags are in the routing list.

After box 490, the production system advances to box 492 where it determines if there is a return tag list. The return tag list is created by some applications and includes a list of tag values that identify translators. The return tag list is sent to the recovery system to provide a routing list that the recovery system can use in preparing responses to the current channel data. By including a separate return tag list, the recovery system can send its reply using a set of translators that are distinct from the translators used to produce the channel data.

If there is no return tag list at decision box 492, the output channel data from the production system is produced by concatenating the current data with the current routing list and the in-tag count. This output is shown in box 494 with vertical lines indicating concatenation. Once the channel data has been formed, an address header is concatenated to the channel data to form a packet that is sent through the channel by the production system at box 496.

If there is a return tag list at decision box 492, the current routing list is stored in box 498 and the return tag list is set as the current routing list in box 500.

Control then passes to box 482 of FIG. 4B and the steps of boxes 482, 484 and 486, as described above, are repeated for the return tag list. The steps of FIG. 4B thereby minimize the size of the return tag list by substituting macro tags for some of the tag values in the return tag list. In box 487 of FIG. 4B, control is returned to box 502 of FIG. 4C.

In box 502, the values of the modified current routing list from box 486 become the new return tag list. In box 504, the stored current routing list is recovered. The tags in the return tag list are then counted to produce an out-tag count in box 506. In box 508, the in-tag count is incremented by one so that a return tag ID byte may be added to the current routing list to indicate that a return tag list is present. Box 510 concatenates the return tag ID to the current routing list to produce a new current routing list. In box 512, the output channel data is formed as the concatenation of the current data with the return tag list, the out-tag count, the current routing list and the in-tag count. The channel data is concatenated with a destination address and is sent through the channel at box 496.

FIGS. 9A–9I provide an example of the progression of a set of data as it passes through the process described in FIGS. 4A–4C. In FIG. 9A, an original string of data 621, a routing list 623 and a return tag list 625 are produced by an application. Routing list 623 includes three translator names 627, 628 and 630. Although routing list 623 is comprised of a set of translator names, those skilled in the art will recognized that the application can also create the routing list with the hexadecimal tag values for the translators.

In FIG. 9B, the message router has converted the translator names in routing list 623 into their respective hexadecimal tag values. In addition, the tag name for return tag list 625 has been converted into its hexadecimal value. The message router has also created a routing tag pointer 634, which points to tag 627.

FIG. 9C shows the data after it has passed through a first translator identified by tag value 627. The translator has converted data 621 into encrypted data 638, and has incremented pointer 634 so that it becomes pointer 640, which points at tag value 628 of routing list 623.

FIG. 9D shows the various data structures and routing structures after the data has passed through a second translator. The second translator is identified by tag value 628. The second translator has compressed what was encrypted data 638, forming compressed-and-encrypted data 644. The translator has also incremented routing list pointer 640 to form routing list pointer 646, which points to tag value 630 of routing list 623.

FIG. 9E shows the various values after compressed-and-encrypted data 644 has been passed through the translator associated with tag value 630 of routing list 623. Tag value 630 is associated with a translator that encodes data using a pager data encoding system. The result of this encoding at stage 648 is pager encoded-and-compressed-and-encrypted data 650. The translator associated with tag value 630 also increments routing list pointer 646 to produce routing list pointer 652, which points at null.

In FIG. 9F, routing list 623 has been minimized to become routing list 656 by replacing tag values 628 and 630 with macro-tag value 658. In FIG. 9G, the number of tag values in the routing list and the number of tag values in the return tag list have been counted, resulting in in-tag count 662 and out-tag count 664.

In FIG. 9H, a return tag ID 668 has been added and in-tag count 662 has been incremented by one to produce in-tag count 670.

In FIG. 9I, the various portions of the output string have been organized and concatenated to produce channel data 674. From front to end, with the front or start of the string shown on the right in FIG. 9I, channel data 674 consists of in-tag count 670, return tag ID 668, tag value 627, macro-tag value 658, out-tag count 664, return tag value 625 and pager encoded-and-compressed-and-encrypted data 650.

In box 472 of FIG. 4A, it was noted that some translators change the current routing list. These translators, known as macro-translators, are invoked whenever the production system encounters a macro-tag in the routing list. A macro-tag is a single tag that represents multiple translations. In order to properly translate the data, the routing list is modified by the respective macro-translator by replacing the macro-tag with the series of tags that the macro-tag represents.

Figure 10:
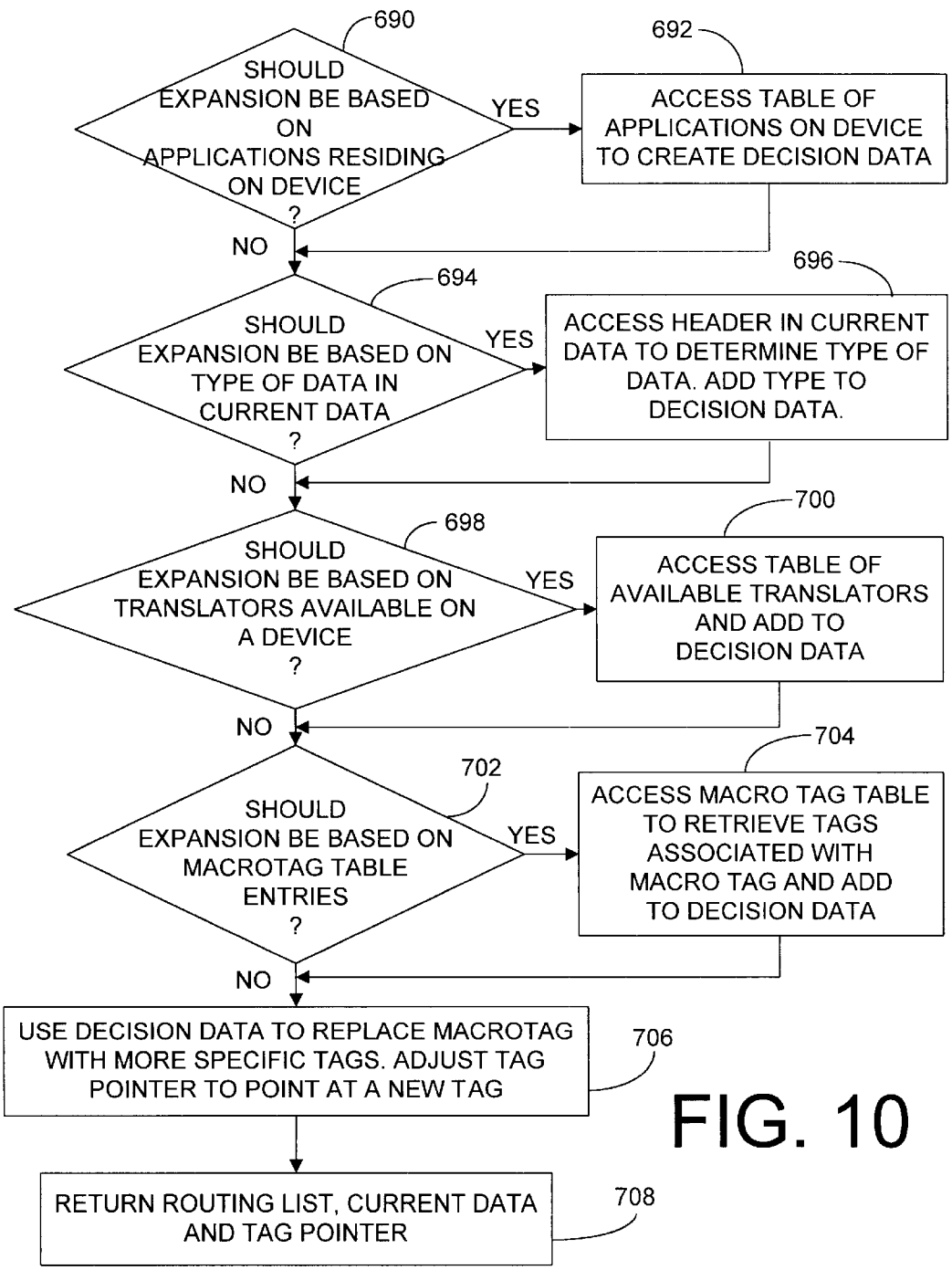
FIG. 10 is a flow diagram for macro-tag expansion.

Macro-tags can be expanded based on several different criteria. FIG. 10 is a flow diagram describing the various criteria that can be considered in expanding a macro-tag. In decision box 690 of FIG. 10, the system determines whether an expansion should be based on applications residing on the device. In this context, the device can either be the production system or the recovery system. Thus, if the recovery system has an application that can process data in a particular format, the macro-tag expansion can be performed such that the data is placed in that format.

If the expansion is to be based on what applications reside on a device, the process continues at box 692 where a table containing a list of device applications is accessed to create a collection of decision data. After the decision data has been created, or if the expansion is not to be based on applications that reside on a device, the process continues at decision box 694.

In decision box 694, the production system determines whether the expansion should be based on the type of data found in the current data. Expansions based on the current data type are helpful since certain types of data perform better with the certain types of translators. For example, some data compresses better than other data.

If the expansion is to be based on the type of data in the current data, control is passed to box 696 where a header within the current data is accessed to determine the type of data present. The data type is then added to the decision data.

After the data type has been determined or if the data type is not going to be used in the expansion, the process continues at decision box 698 where the production system determines if the expansion should be based on translators available on a device. In this context, the device can either be the device where the production system resides or the device where the recovery system resides.

If the expansion is to be based on available translators, control is passed to box 700 where a table of available translators is accessed. The available translators are then added to the decision data.

Once the translators have been added to the decision data or if the expansion is not to be based on available translators, the production system determines at box 702 whether the expansion should be based on macro-tag table entries. A macro-tag table entry refers to a string of tags associated with a macro-tag as found in macro-tag table 620 of FIG. 8. If the expansion is to be based on a macro-tag table entry, the production system accesses the macro-tag table to retrieve the string of tags associated with the macro-tag and adds the string of tags to the decision data in box 704.

Once the string of tags associated with the macro-tag has been added to the decision data, or if the expansion is not to be based on a macro-tag table entry, the production system moves to box 706 where the decision data is used to replace the macro-tag with more specific translator tags. The decision data at this point consists of any one of the items discussed above including available applications, data type, available translators and macro-tag table entries. In addition, the decision can be made on the basis of multiple types of decision data. Thus, the production system can initially base its expansion on the macro-tag table entry and then modify the string of tags received from the macro-tag table so that only those translators that are present on the device are actually included.

Once the macro-tag has been replaced with the expanded translator tag string, the production system adjusts the tag pointer to point at a new tag, preferably within the expanded string of tags. Note that the pointer does not have to point at the first tag in the expanded string of tags. This allows the recovery systems to use a different set of translation tags than the production system, which can be useful in some applications. Once the tag pointer and the routing list have been adjusted, macro-tag translation proceeds to box 708 where the routing list, the current data and the tag pointer are returned.

Figure 11:
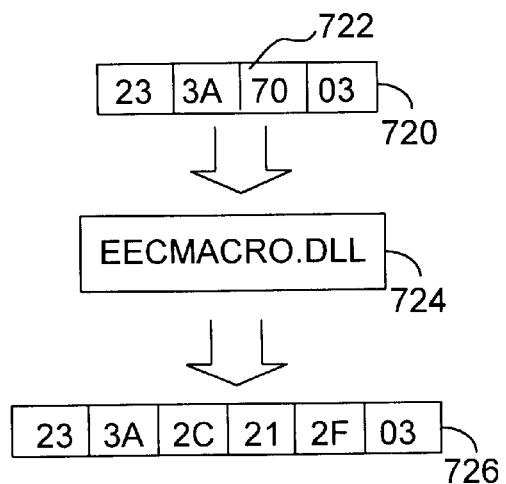
FIG. 11 shows the effects of a macro-tag expansion on a routing list.

FIG. 11 shows a transformation of a routing list as it passes through the macro-tag expansion described in FIG. 10. For clarity of more than one aspect of the invention, the expansion shown in FIG. 11 uses tag table 600 of FIG. 7 and macro-tag table 620 of FIG. 8.

In FIG. 11, routing list 720 includes a macro-tag 722 that has a hexadecimal value of "70". In entry 612 of tag table 600 of FIG. 7, tag value "70" has an associated translator ID of "EECMACRO.DLL". Thus, routing list 720 is forwarded to EECMACRO. DLL 724 in FIG. 11. EECMACRO.DLL 724 replaces macro-tag 70 with its associated tag string "2C 21 2F" found in entry 626 of macro-tag table 620 of FIG. 8. The result of this expansion is expanded routing list 726 of FIG. 11.

Figure 12:
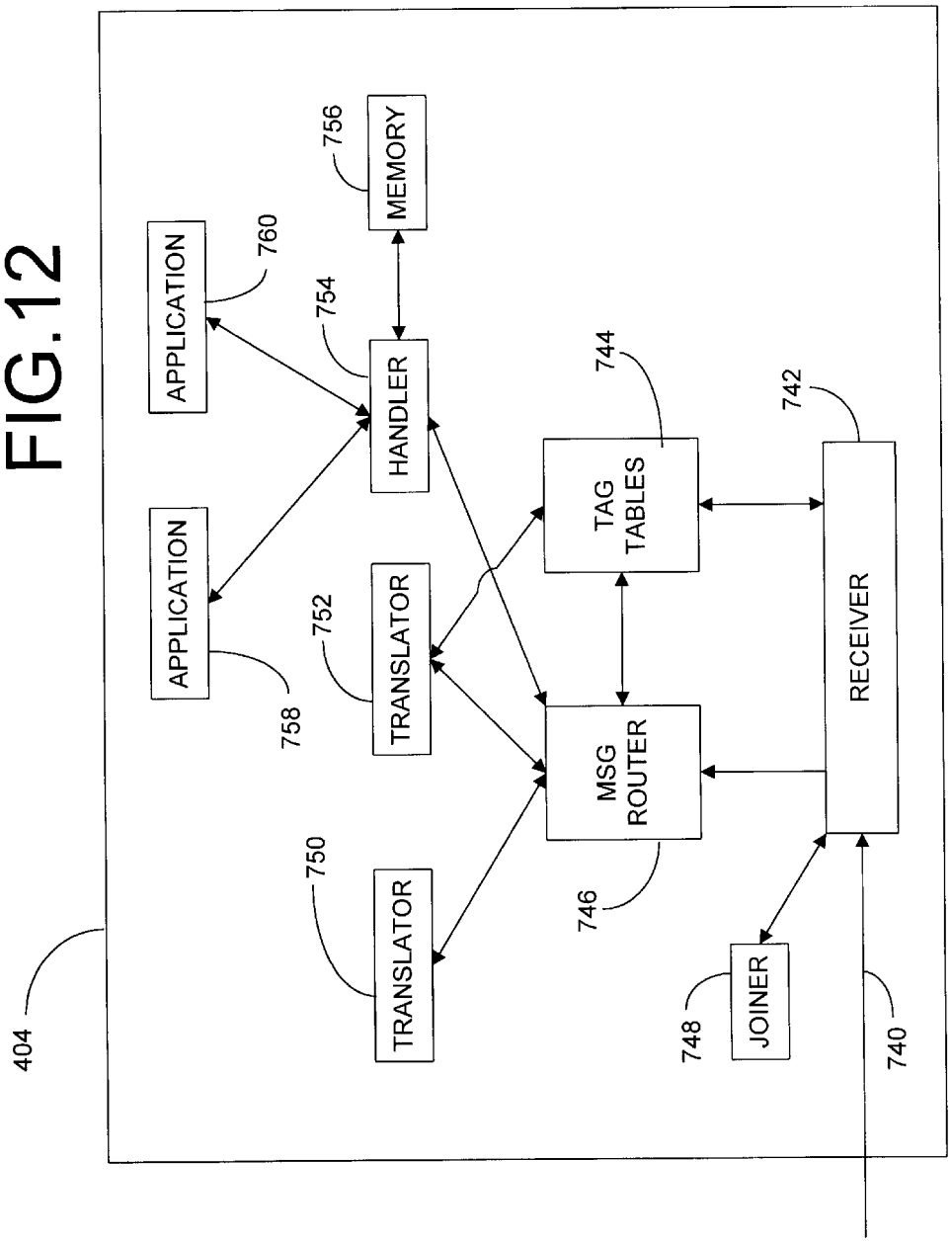
FIG. 12 is a block diagram of a recovery system used with the present invention.

FIG. 12 is a block diagram of recovery system 404 of FIG. 1. Channel data 740 is received from the channel at a receiver 742. In wireless systems, receiver 742 is preferably a radio device driver that is capable of operating without fully waking the entire wireless device.

Before translating any part of the channel data, recovery system 404 determines if it has the translators needed to recover the original data. In one embodiment, this determination is made by receiver 742. In another embodiment, this determination is made by a message router 746 after receiving the channel data from receiver 742.

Recovery system 404 includes address-tag table 745, which has the same information and hierarchical format as address-tag table 429 of production system 402 of FIG. 3. Depending on the desired configuration, receiver 742, message router 746 or both are coupled to address-tag table 745.

If the message received has no routing list on it, recovery system 404 uses the destination address of the data and address-tag table 745 to identify a routing list. If the message is accompanied by a routing list, address-tag table 745 is not searched, and the accompanying routing list is identified as the routing list. Thus, either the destination address for the data or the routing list accompanying the data can act as a translation identifier to identify the translations that must be performed on the data. Note that in either case, the routing list can be identified before a translation has been performed on the received data.

Depending on the desired configuration, either receiver 742 or message router 746 parses out the identified routing list and examines each tag value in the routing list. Specifically, a tag table 744 is accessed to determine if the recovery system has the translators needed to recover the original data from the channel data. If a tag value in the routing list is not present in tag table 744, the message is rejected.

If the channel data is not rejected, message router 746 reads a tag value from the routing list, accesses tag table 744 to retrieve the identification for the associated translator and forwards the data, the routing list and a pointer to the routing list to the appropriate translator.

In FIG. 12, two translators 750 and 752 are shown as examples of translators. Those skilled in the art will recognize that more translators are possible in recovery system 404. Message router 746 sequentially reads through the routing list while sequentially passing the data to each of the associated translators. Once the data has passed through all of the translators identified by the routing list, message router 746 forwards the data to a handler 754 along with the routing list and any return tag list. Handler 754 stores the routing list and the return tag list in a memory 756 and forwards the data to the appropriate application, such as application 758 or application 760.

Figure 13A:
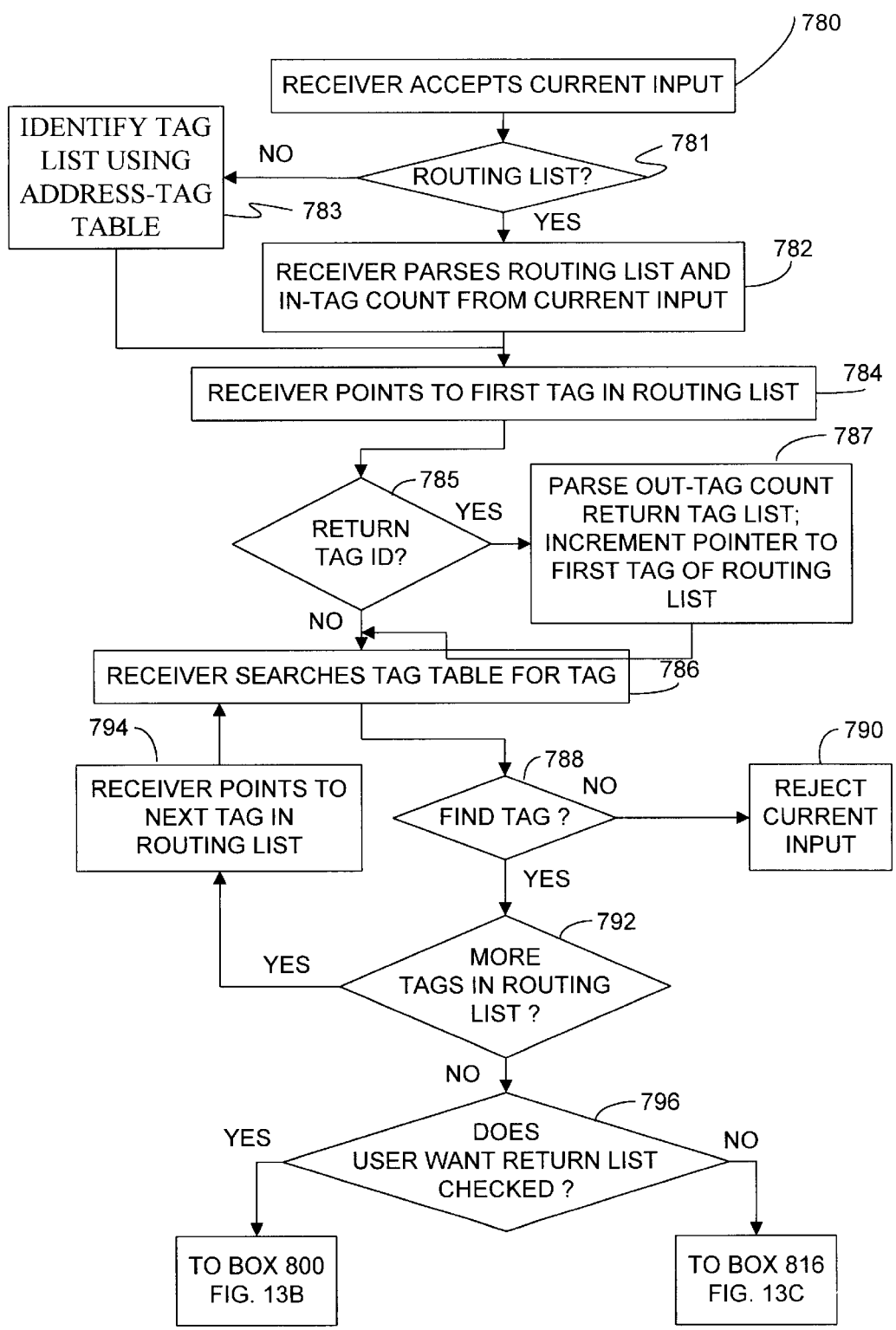
FIGS. 13A, 13B, and 13C are flow diagrams for a process for recovering a core set of data from a channel packet under the present invention.
Figure 13B:
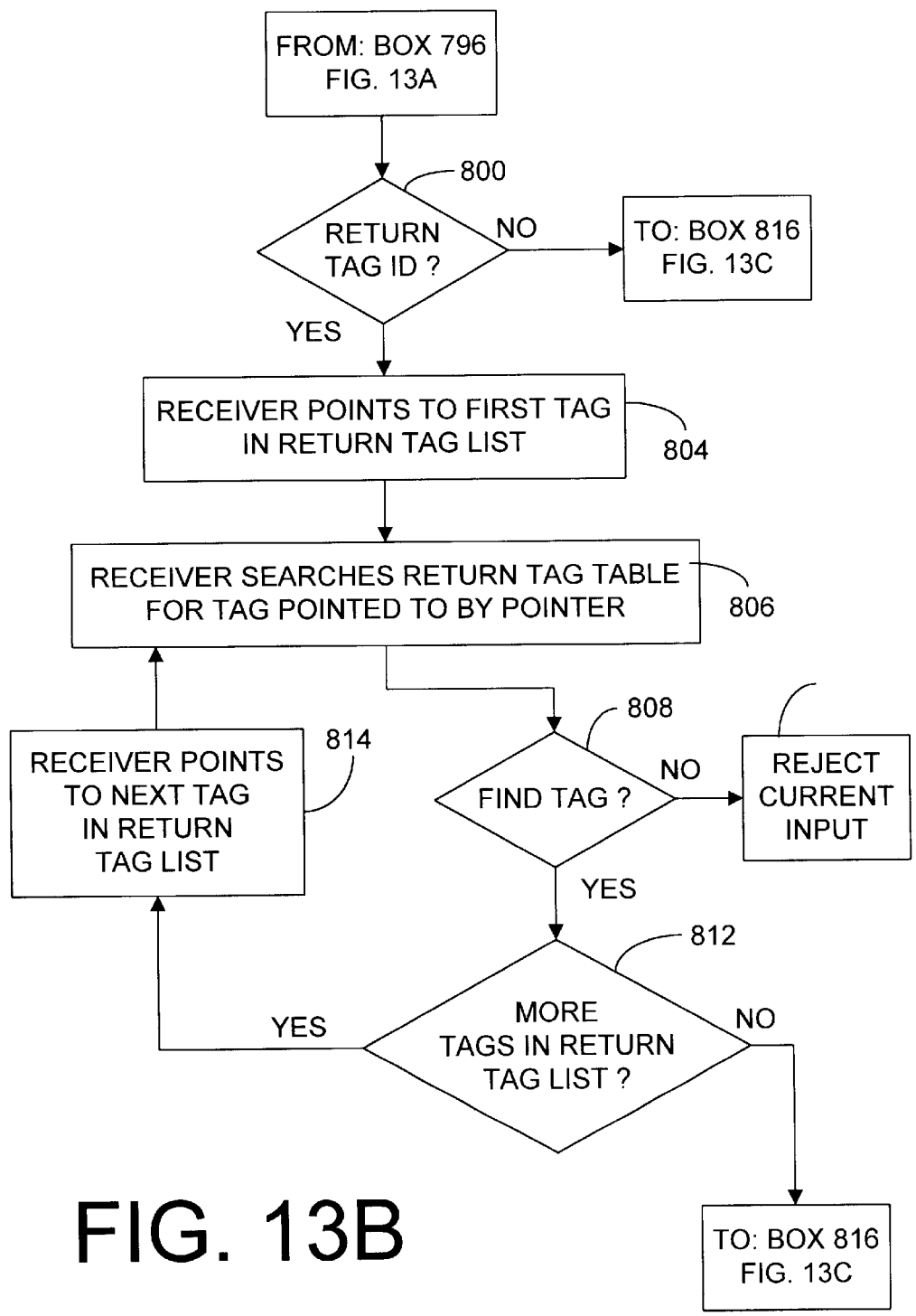
Figure 13C:
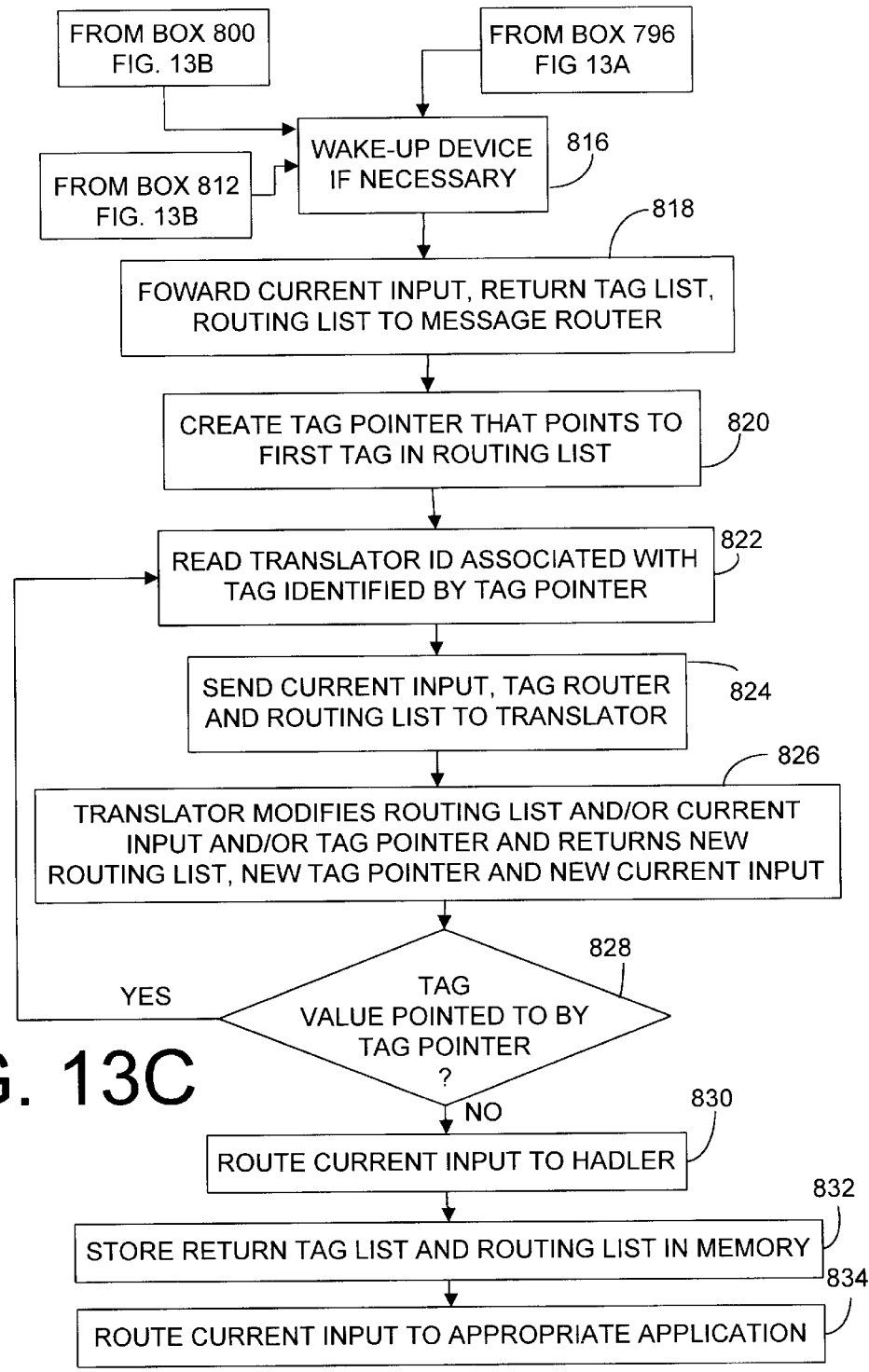

The process implemented by recovery system 404 of FIG. 12 is discussed in more detail in the flow diagrams of FIGS. 13A, 13B and 13C for an embodiment where the determination of whether to reject the incoming data is made by message router 746. In box 780 of FIG. 13A, router 746 accepts the channel data from the receiver. In step 781, the router checks to see if the channel data includes a routing list. If it does, the process continues at step 782, where the router parses the routing list and in-tag count from the current input. If the channel data does not include a routing list, the process proceeds from step 781 to step 783 where a routing list is identified using an address-tag table and the destination address of the channel data. The identification of the routing list using the address-tag table is the same as described above for the production system. In box 784, the router produces a routing pointer that points to a first tag in the routing list. At decision box 785, the router examines the first tag and determines whether it is a return tag ID. If there is a return tag ID, the channel data includes a return tag list and the router parses the out-tag count and the return tag list at box 787. The router also increments the pointer so that it points at the next tag value in the routing list after the return tag ID.

If there is no return tag ID or after the router has parsed the return tag list, the process continues at box 786 where the router searches tag table 744 for the tag value addressed by the routing list pointer.

If the router cannot find the tag value in tag table 744 at decision box 788, the current input is rejected at box 790. If the tag is found in tag table 744, the router determines whether there are more tags in the routing list as shown in decision box 792. If there are more tags in the routing list, the router advances the pointer to point at the next tag in the routing list as shown in box 794. The process then returns to box 786 so that the new tag can be searched in the tag table.

If there are no more tags in the routing list at decision box 792, all of the tags in the routing list represent translators that are present on the recovery system. The process then continues at decision box 796 where the recovery system determines whether the return tag list should be checked to ensure that the recovery system has all of the translators necessary to produce a return message. If the return tag list is to be checked in decision box 796, control passes to box 800 of FIG. 13B.

In box 800 of FIG. 13B, the recovery system checks to see if the channel data included a return tag ID. If the recovery system does not find a return tag ID at decision box 800, the process continues at box 816 of FIG. 13C. If a return tag ID is found at decision box 800, control passes to box 804 where the router sets a pointer to point at the first tag in the return tag list.

At box 806, the router searches through a return tag table for the tag value pointed to by the pointer. If the tag is not found in decision box 808, the current input is rejected in box 810. If the tag is found in decision box 808, the recovery system looks to see if more tags are in the return tag list at decision box 812. If more tags are present in the return tag list, control passes to box 814 where the router increments the pointer to point to the next tag in the return tag list. Control is then returned to box 806.

The loop formed by boxes 806, 808, 812 and 814 continues until there are no more tags in the return tag list. If there are no more tags in the return tag list at decision box 812, the recovery system has all of the translators that are represented by tag values in the return tag list.

When the last tag is reached at decision box 812, control is passed to box 816 of FIG. 13C.

The recovery system reaches box 816 of FIG. 13C if the return list was not checked in box 796 of FIG. 13A, if the return tag ID was not found in decision box 800 of FIG. 13B, or if the return tag list was checked and all of the tags in return tag list were found. In box 816, the message router creates a tag pointer that points to the first tag in the routing list. In box 822, message router 746 reads tag table 744 and retrieves the translator ID associated with the tag identified by the tag pointer. Message router 746 then sends the current input, tag pointer and routing list to the retrieved translator, as shown in box 824.

In box 826, the translator modifies the routing list and/or the current input and the tag pointer and returns a new routing list, new tag pointer and new current input.

At decision box 828, the message router determines whether the tag pointer is pointing at a tag value. If it is pointing at a tag value, the process returns to box 822 and the translator ID associated with the tag value is retrieved from tag table 744. The loop formed by boxes 822, 824, 826 and 828 repeats until the last tag in the routing list is used to identify a translator. When the pointer passes the last tag in the routing list, the current input should have been transformed from the channel data to the core set of data initially produced by the application in production system 402 of FIG. 2.

At box 830, the current input, routing list and return tag list, if present, are passed to handler 754 of FIG. 12. In box 832, handler 754 stores the return tag list, if it is present, and the routing list in memory 756. The stored values will be retrieved if the application wants to send a return message to the production system based on the current input. In box 834, handler 754 routes the current input to the appropriate application.

FIGS. 14A–14H show the transformation of a set of channel data received by receiver 742 in FIG. 12. To aid in understanding the invention, the data used in FIGS. 14A–14H is the same as channel data 674 of FIG. 9I.

FIG. 14A shows input channel data 848, as it appears when it is received by receiver 742. In FIG. 14B, router 746 has parsed input channel data 848 into pager encoded-and-compressed-and-encrypted data 852, full routing list 864 and in-tag count 862. In FIG. 14C, router 746 has further parsed full routing list 864 into return tag list 854, out-tag count 856, routing list 858 and in-tag count 862.

In FIG. 14D, message router 746 has created a pointer 874 that points at macro-tag 876 of routing list 870. The message router has also stripped off the return tag ID from routing list 858 to produce routing list 870.

Figure 14E:
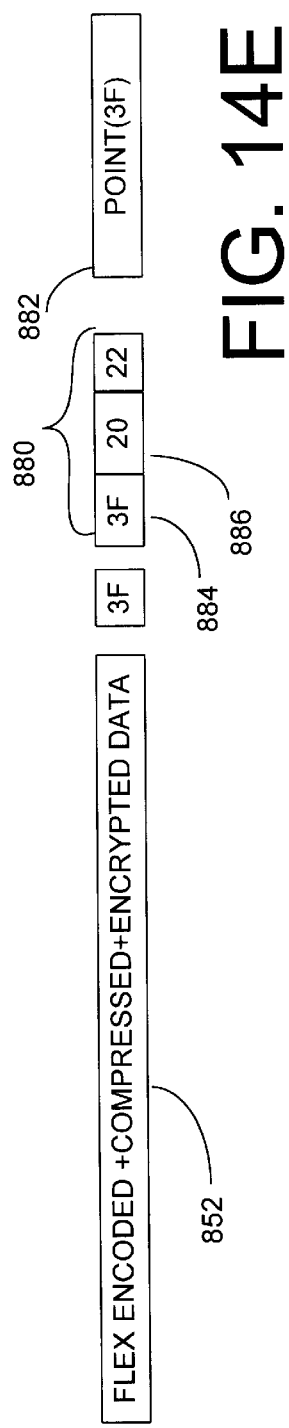

FIG. 14E shows the state of the various data parts after the message router has invoked the macro-tag translator represented by macro-tag 876. The translator associated with macro-tag 876 has expanded routing list 870 to produce expanded routing list 880 by replacing macro-tag 876 with translation tags 884 and 886. The expansion of macro-tag 876 into translation tags 884 and 886 is preferably accomplished using the same method as described in FIG. 10, except that the recovery system is performing the acts necessary to expand the macro-tag into the translation tags. In addition to expanding the macro-tag, the macro-tag translator increments the pointer to produce pointer 882 which points at translator tag 884.

Figure 14F:
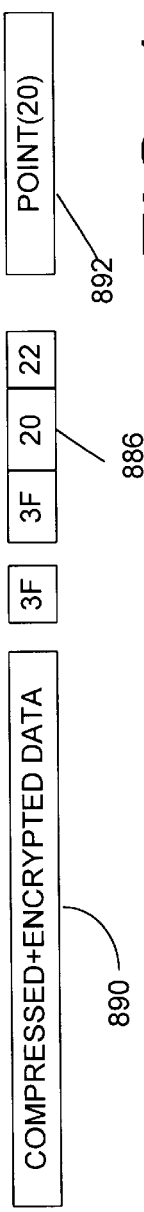

In FIG. 14F, the message router has routed pager encoded-and-compressed-and-encrypted (ECE) data 852 to the translator identified by translator tag 884. This translator has decoded ECE data 852 to produce compressed-and-encrypted data 890. In addition, the translator has incremented pointer 882 to produce pointer 892, which points at translator tag 886.

Figure 14G:
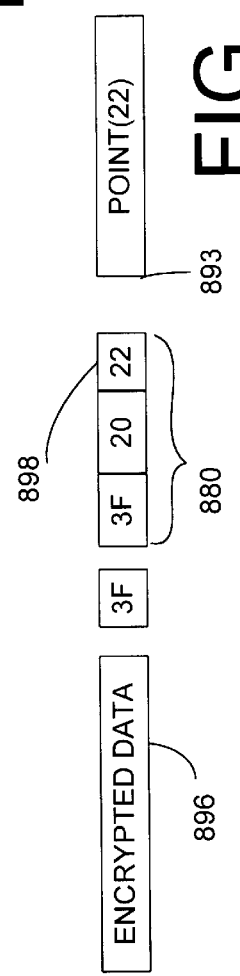

In FIG. 14G, the message router has routed compressed-and-encrypted data 890 to the translator identified by translator tag 886. This translator has decompressed the compressed-and-encrypted data 890 to produce encrypted data 896. The translator has also incremented pointer 892 to produce pointer 893, which points to translation tag 898 of routing list 880.

Figure 14H:
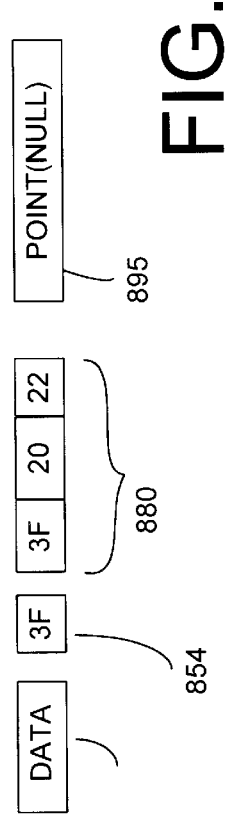

FIG. 14H shows the various data strings after all of the translations are complete. Specifically, in FIG. 14H encrypted data 896 has been routed to the translator identified by translator tag 898. The translator has unencrypted encrypted data 896 resulting in core data 902. The translator has also incremented pointer 893 to produce pointer 895, which points at null. At this stage, the message router routes core data 902, return tag list 854 and routing list 880 to the handler.

Figure 15:
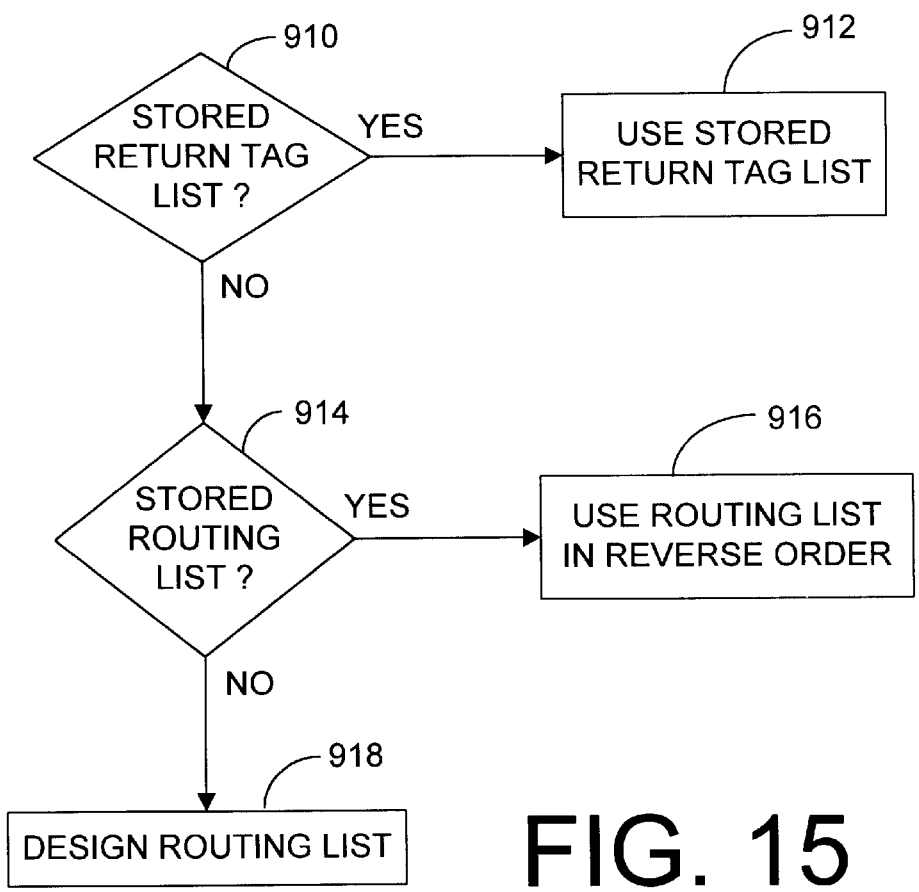
FIG. 15 is a flow diagram for selecting a routing list to translate return data produced by the recovery system.

FIG. 15 provides a flow diagram for the process followed by the recovery system in selecting a routing list for translating a return message that the recovery system wants to send back to the production system. In decision box 910 of the process, the recovery system determines if there is a stored return tag list in memory 756. If there is a stored return tag list, the process moves to box 912 where it uses the stored return tag list to translate the return message. If there is no stored return tag list, the process moves to decision box 914 to determine whether there is a stored routing list. If there is a stored routing list in memory 756, the recovery system retrieves the routing list and in box 916 uses the routing list to translate the return message. Preferably, the recovery system reverses the order of the routing list so that the last translation performed by the recovery system to recover the core data from the channel data is the first translation performed on the return message. If there is no stored routing list at decision box 914, the recovery system must design its own routing list at box 918.

Although the present invention has been described with reference to preferred embodiments, workers skilled in the art will recognize that changes may be made in form and detail without departing from the spirit and scope of the invention.

What is claimed is:

1. A recovery system, capable of recovering a core set of data from an input set of data, the input set of data accompanied by a translator identifier, the recovery system comprising:

a receiver, for receiving the input set of data and the translator identifier; and a message router functionally coupled to the receiver and being capable of accessing a recovery tag list that is based on the translator identifier before the recovery system has translated the input set of data and being capable of routing data based on the recovery tag list identified by the receiver.

2. The recovery system of claim 1 wherein the translator identifier is a tag list accompanying the input set of data.

3. The recovery system of claim 2 wherein the receiver is a driver capable of identifying the recovery tag list based on the translator identifier and of rejecting the input set of data if the recovery system does not include a translator required by the recovery tag list before the message router is activated.

4. The recovery system of claim 3 wherein the message router is capable of rejecting the input set of data before the message router has routed data based on a portion of the recovery tag list.

5. The recovery system of claim 2 wherein at least one translator can determine if the tag list comprises return tag values indicative of a return tag list to be used to generate an output set of data in response to the core set of data.

6. The recovery system of claim 5 wherein the message router is further capable of rejecting the input set of data if the recovery system does not include a translator required by a return tag value in the return tag list.

7. The recovery system of claim 2 further comprising a memory for storing the tag list as a stored tag list, the stored tag list capable of being used to produce an output set of data in response to the core set of data.

8. The recovery system of claim 7 further comprising at least one output translator capable of producing an output set of data.

9. The recovery system of claim 1 further comprising a macro-tag translator, the macro-tag translator being capable of receiving both a set of data and the recovery tag list.

10. The recovery system of claim 9 wherein the macro-tag translator is capable of modifying the recovery tag list.

11. The recovery system of claim 10 wherein the macro-tag translator modifies the recovery tag list based on the tag values in the recovery tag list.

12. The recovery system of claim 10 wherein the macro-tag translator modifies the recovery tag list based on the input set of data.

13. The recovery system of claim 10 wherein the macro-tag translator modifies the recovery tag list based on the available translators in the recovery system.

14. The recovery system of claim 10 wherein the macro-tag translator modifies the recovery tag list based on the input set of data and the tag values in the recovery tag list.

15. The recovery system of claim 10 wherein the macro-tag translator modifies the recovery tag list based on applications stored on a same device as the recovery system.

16. The recovery system of claim 10 wherein the macro-tag translator modifies the recovery tag list using a tag table of tag values.

17. The recovery system of claim 1 further comprising a tag table, the tag table associating a single tag value with a set of tag values.

18. The recovery system of claim 1 wherein the translator identifier is a destination address for the core set of data in the recovery system.

19. The recovery system of claim 18 wherein the destination address comprises a primary address and a sub-address.

20. The recovery system of claim 19 wherein the receiver attempts to identify a tag list associated with the sub-address.

21. The recovery system of claim 20 wherein the receiver attempts to identify a tag list associated with the primary address if it cannot identify a tag list associated with the sub-address.

22. The recovery system of claim 21 wherein the receiver identifies a default tag list if it cannot identify a tag list associated with the primary address.

23. The recovery system of claim 21 wherein the message router identifies a default tag list if it cannot identify a tag list associated with the primary address.

24. The recovery system of claim 19 wherein the message router attempts to identify a tag list associated with the sub-address.

25. The recovery system of claim 20 wherein the message router attempts to identify a tag list associated with the primary address if it cannot identify a tag list associated with the sub-address.

26. The recovery system of claim 1 wherein the receiver identifies a tag list accompanying the input set of data as the recovery tag list if a tag list accompanies the input set of data but otherwise attempts to identify a tag list based on a destination address for the core set of data.

27. The recovery system of claim 1 wherein the message router identifies a tag list accompanying the input set of data as the recovery tag list if a tag list accompanies the input set of data but otherwise attempts to identify a tag list based on a destination address for the core set of data.

28. The recovery system of claim 1 wherein the recovery system resides on a wireless device.

29. A method of forming channel data from a core set of data comprising:

performing multiple translations on the core set of data in a sequential manner to form translated data;

creating a list of translations representative of the order and types of translations performed on the core set of data; and concatenating the translated data with the list of translations to form the channel data.

30. The method of claim 29 further comprising, before concatenation, comparing the list of translations to a destination-based list of translations associated with a destination address for the channel data and not concatenating the list of translations if the list of translations matches the destination-based list of translations.

* * * * *

UNITED STATES PATENT AND TRADEMARK OFFICE
CERTIFICATE OF CORRECTION

PATENT NO.    : 6,507,874 B1  Page 1 of 1
DATED         : January 14, 2003
INVENTOR(S)   : Tuniman et al.

Figure 6B:
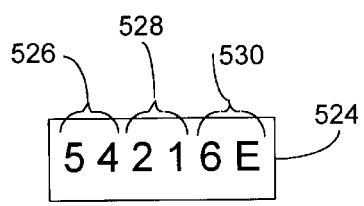
FIG. 6B shows the structure of a three-byte tag.
Figure 6C:
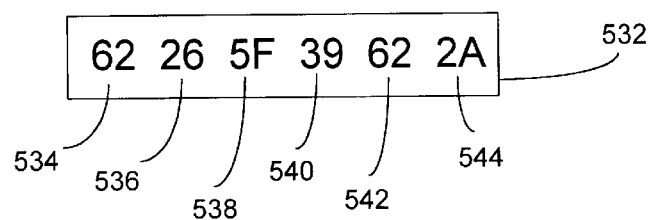
FIG. 6C shows the structure of a variable length tag.

It is certified that error appears in the above-identified patent and that said Letters Patent is hereby corrected as shown below:

Column 6,
Line 34, replace "FIG. GB" with -- FIG. 6B --.

Signed and Sealed this

Twenty-second Day of July, 2003

JAMES E. ROGAN
*Director of the United States Patent and Trademark Office*